United States Patent
Ishihara

(10) Patent No.: US 7,581,764 B2
(45) Date of Patent: Sep. 1, 2009

(54) CONNECTION SEAL STRUCTURE FOR FLUIDIC DEVICE

(75) Inventor: Tetsuya Ishihara, Komaki (JP)

(73) Assignee: CKD Corporation, Komaki (JP)

( * ) Notice: Subject to any disclaimer, the term of this patent is extended or adjusted under 35 U.S.C. 154(b) by 0 days.

(21) Appl. No.: 11/666,206

(22) PCT Filed: Nov. 30, 2004

(86) PCT No.: PCT/JP2004/017757

§ 371 (c)(1), (2), (4) Date: Apr. 25, 2007

(87) PCT Pub. No.: WO2006/059362

PCT Pub. Date: Jun. 8, 2006

(65) Prior Publication Data

US 2007/0262581 A1 Nov. 15, 2007

(51) Int. Cl.
*F16L 17/00* (2006.01)
(52) U.S. Cl. ........................... 285/336; 285/331
(58) Field of Classification Search .................. 285/336, 285/328, 335, 331, 349; 277/608, 626, 644
See application file for complete search history.

(56) References Cited

U.S. PATENT DOCUMENTS

| | | | | | |
|---|---|---|---|---|---|
| 3,726,320 | A | * | 4/1973 | Lachenmayer | 138/103 |
| 3,747,963 | A | * | 7/1973 | Shivak | 285/336 |
| 4,303,251 | A | * | 12/1981 | Harra et al. | 277/614 |
| 5,196,814 | A | * | 3/1993 | Felker et al. | 285/336 |
| 5,466,018 | A | * | 11/1995 | Stobbart | 285/336 |
| 6,113,158 | A | * | 9/2000 | Bocchicchio et al. | 285/331 |
| 2009/0066081 | A1 | * | 3/2009 | Katsura | 285/331 |
| 2009/0091125 | A1 | * | 4/2009 | Takeda et al. | 285/88 |

FOREIGN PATENT DOCUMENTS

| | | | |
|---|---|---|---|
| JP | U 6-30564 | | 4/1994 |
| JP | A 10-227361 | | 8/1998 |
| JP | A 10-245066 | | 9/1998 |
| JP | A 2000-211666 | | 8/2000 |
| JP | A 2001-124206 | | 5/2001 |
| JP | A 2001-149844 | | 6/2001 |
| JP | A 2002-115760 | | 4/2002 |
| JP | 2005140230 A | * | 6/2005 |
| JP | 2006183730 A | * | 7/2006 |
| JP | 2008133838 A | * | 6/2008 |
| JP | 2008267428 A | * | 11/2008 |
| JP | 2009036308 A | * | 2/2009 |

* cited by examiner

*Primary Examiner*—Aaron M Dunwoody
(74) *Attorney, Agent, or Firm*—Oliff & Berridge, PLC

(57) ABSTRACT

A connection seal structure for a chemical valve (1) in which a resin manifold base (3) and a resin valve assembly (4) are connected to each other includes an H-shaped resin ring (20) interposed between a connection portion (7) of the base (3) and a connecting portion (19) of the valve assembly (4). The connecting portion (7) of the base (3) and a corresponding portion of the H-shaped ring (20) are formed with groove-ridge lines (21, 22) respectively, which engage with each other in a groove-ridge relationship. The connecting portion (19) of the valve assembly (4) and a corresponding portion of the H-shaped ring (20) are formed with groove-ridge lines (23, 24) respectively, which engage with each other in a groove-ridge relationship. At least one of the groove-ridge lines (21, 22) and at least one of the groove-ridge lines (23, 24) are provided with press-fit allowances in a direction of wall-thickness of each groove-ridge line (21-24).

11 Claims, 19 Drawing Sheets

CONNECTION SEAL STRUCTURE FOR FLUIDIC DEVICE

BACKGROUND

The present invention relates to a fluidic device and more particularly to a connection seal structure thereof.

Conventionally, a seal structure with an interposed elastic body such as rubber, a seal structure using a joint, a welded or bonded seal structure have been generally known as connection seal structures of this type.

One example of a seal structure using no elastic body, joint and welding or bonding means is described in Patent Document 1 listed below. This seal structure is a seal structure concerning the connection between a central block and a lower block which constitute a chemical valve and it is disclosed that both the blocks are connected in a groove-ridge (concave-convex) relationship.

Patent Document 1: JP-A-2001-149844

SUMMARY

However, the seal structure using an elastic body as mentioned above is not sufficiently corrosion-resistant to acids and alkalis and not suitable for use with a chemical or the like. The seal structure using a joint requires a space for the joint itself or joint formation, resulting in a tendency toward a larger structure. In the case of a welded or bonded seal structure, removal or disassembly after connection is impossible and maintenance work is hard to do.

On the other hand, concerning the seal structure described in Patent Document 1, any concrete structure for sealing is not shown although the two blocks are connected in a groove-ridge relationship.

The present invention has been made in view of the above circumstances and an object thereof is to provide a seal structure for a fluidic device which is corrosion-resistant and maintainable and contributes to downsizing.

To achieve the above object, the invention has a connection seal structure for a fluidic device including a first component made of resin and a second component made of resin, which are connected with each other, characterized by comprising: groove-ridge lines which are formed in a connecting portion of the first component and a connecting portion of the second component respectively and engage with each other in a groove-ridge relationship; and a press-fit allowance provided in at least one of the groove-ridge lines in a direction of wall-thickness of the groove-ridge line.

According to the above configuration, the groove-ridge line of the connecting portion of the first resin component and the groove-ridge line of the connecting portion of the second resin component engage with each other, so that the groove-ridge lines are press-fitted by the press-fit allowance, thereby sealing the connecting portions of the first and second components.

To achieve the above object, the invention has a connection seal structure for a fluidic device including a first component made of resin and a second component made of resin, which are connected with each other, characterized by comprising: a seal component made of resin interposed between a connecting portion of the first component and a connecting portion of the second component; groove-ridge lines which are formed in the connecting portion of the first component and a corresponding portion of the seal component and engage with each other in a groove-ridge relationship; groove-ridge lines which are formed in the connecting portion of the second component and a corresponding portion of the seal component and engage with each other in a groove-ridge relationship; and a press-fit allowance provided in at least one of the corresponding groove-ridge lines in a direction of wall-thickness of the groove-ridge line.

According to the above configuration, when the connecting portion of the first resin component and the connecting portion of the second resin component are to be connected with each other, the groove-ridge line of the first component and the groove-ridge line of the seal component are engaged with each other while the groove-ridge line of the second component and the groove-ridge line of the seal component are engaged with each other. Accordingly, the groove-ridge lines are press-fitted by the press-fit allowances. Consequently, the connecting portions of the first and second components are sealed through the seal component.

To achieve the above object, the invention has a connection seal structure for a fluidic device including a first component made of resin and a second component made of resin, which are connected with each other, characterized by comprising: an annular seal component made of resin interposed between a connecting portion of the first component and a connecting portion of the second component; and circumferential protrusions formed in the connecting portion of the first component and the connecting portion of the second component, wherein, when the connecting portion of the first component and the connecting portion of the second component are pressed against each other in an axial direction with the annular seal component interposed between them, the circumferential protrusions break into the annular seal component and connect them.

According to the above configuration, when the connecting portion of the first resin component and the connecting portion of the second resin component are to be connected with each other, the annular seal component is in pressure contact with the connecting portion of the first component and the connecting portion of the second component and also the circumferential protrusion of the first component and the circumferential protrusion of the second component break or bite into the annular seal component interposed between them and come into close contact with the annular seal component.

The first component and the second component are made of resin respectively, so that the seal structure for the fluidic device for dealing with chemicals such as acids and alkalis can provide sufficient corrosion-resistance. Further, a space for a joint or joint formation can be eliminated, which contributes to downsizing. Furthermore, since the seal structure does not include any welded or bonded part, removal or disassembly after connection is possible and thus maintenance work can be done on the first and second components.

The first component, the second component, and the seal component are made of resin respectively, so that the seal structure for the fluidic device for dealing with chemicals such as acids and alkalis can provide sufficient corrosion-resistance. Further, a space for a joint or joint formation can be eliminated, which contributes to downsizing. Furthermore, since the seal structure does not include any welded or bonded part, removal or disassembly after connection is possible and thus maintenance work can be done on the first and second components.

The first component, the second component, and the annular seal component are made of resin respectively, so that the seal structure for the fluidic device for dealing with chemicals such as acids and alkalis can provide sufficient corrosion-resistance. Further, a space for a joint or joint formation can be eliminated, which contributes to downsizing. Furthermore, since the seal structure does not include any welded or bonded part, removal or disassembly after connection is possible and thus maintenance work can be done on the first and second components.

EXPLANATION OF REFERENCE CODES

Figure 1:
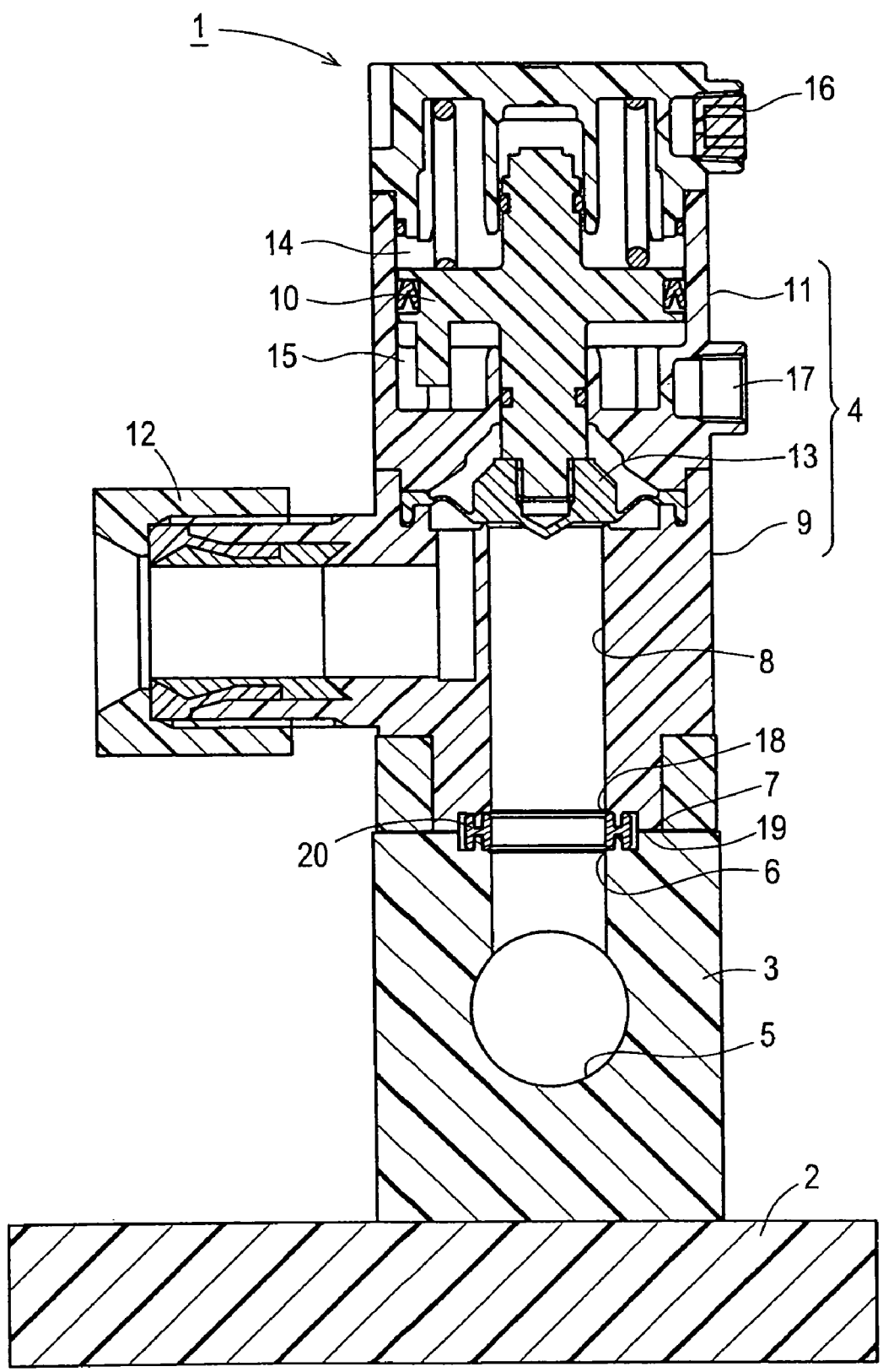
FIG. 1 is a sectional view showing a chemical valve.

1 Chemical valve (Fluidic device)
3 Manifold base (First component)
4 Valve assembly (Second component)
7 Connecting portion
19 Connecting portion
20 H-shaped ring (Seal component)
21 Groove-ridge line
22 Groove-ridge line
23 Groove-ridge line
24 Groove-ridge line
27 Press-fit allowance
31 Chemical valve (Fluidic device)
32 First small-diameter groove-ridge line
33 First large-diameter groove-ridge line
34 First flow path port
36 Second flow path port
38 Second small-diameter groove-ridge line
40 Third flow path port
42 Fourth flow path port
44 Small H-shaped ring (Small-diameter seal component)
45 Large H-shaped ring (Large-diameter seal component)
61 Chemical valve (Fluidic device)
63 Manifold base (First part)
64 Valve assembly (Second part)
67 Flow path port
68 Connecting portion
75 Flow path port
76 Connecting portion
77 Groove-ridge line
78 Groove-ridge line
79 Press-fit allowance
81 Seal component
82 Groove-ridge line
83 Groove-ridge line
84 Groove-ridge line
85 Groove-ridge line
87 Press-fit allowance
91 Chemical valve (Fluidic device)
96 Annular seal component
97 Annular seal component
98 Circumferential protrusion
99 Circumferential protrusion

DETAILED DESCRIPTION OF EMBODIMENTS

First Embodiment

Next, a first embodiment which embodies a connection seal structure of a fluidic device according to the present invention will be described in detail referring to drawings.

Figure 2:
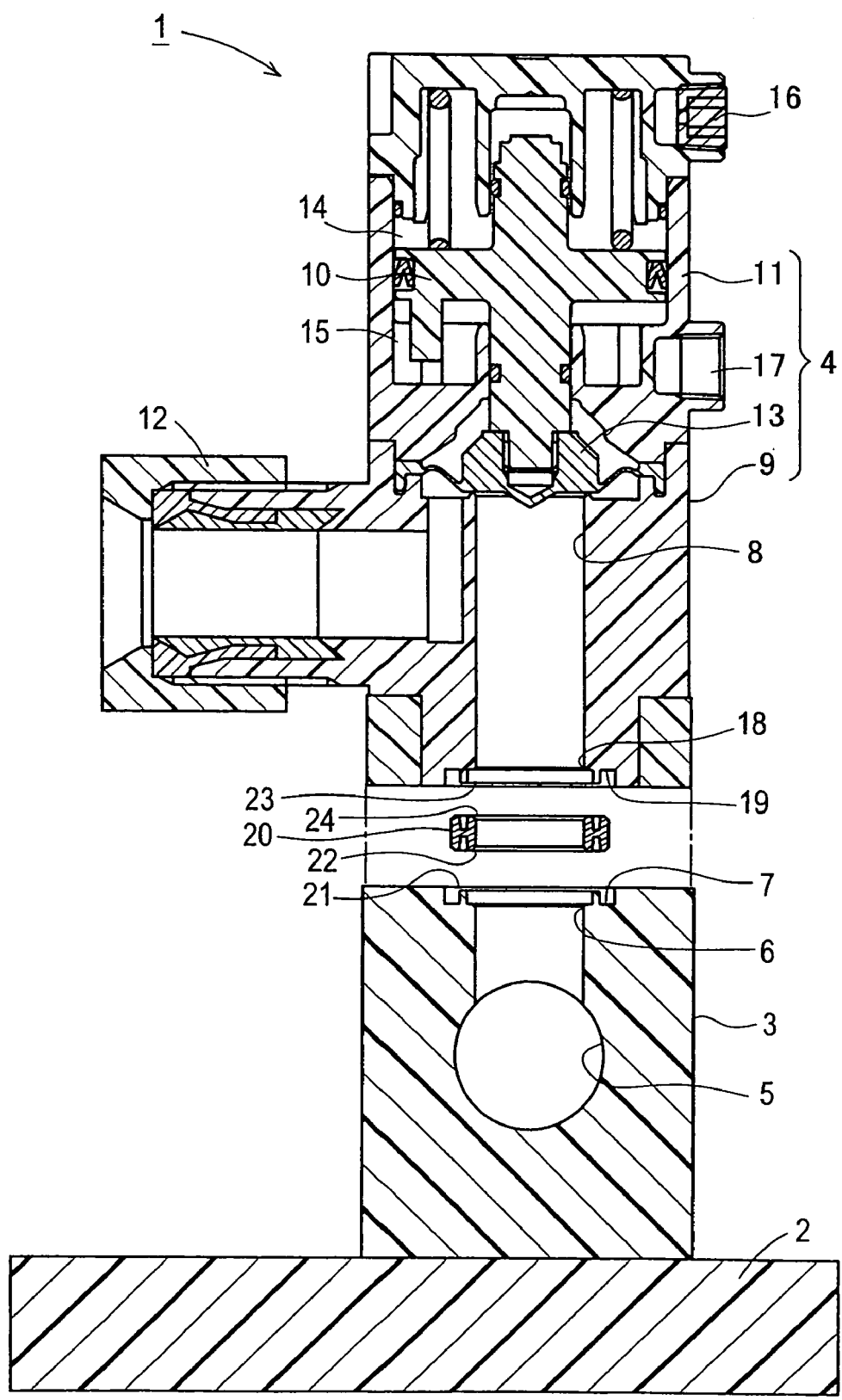
FIG. 2 is an exploded sectional view showing the chemical valve.

FIG. 1 is a sectional view showing a manifold type chemical valve 1 as a fluidic device according to the present invention. FIG. 2 is an exploded sectional view of the chemical valve 1. This chemical valve 1 includes: a mounting plate 2; a resin manifold base 3 fixed on the plate 2; a resin valve assembly 4 fixed on the base 3. In this embodiment, the chemical valve 1 is constituted by connecting the manifold base 3 and the valve assembly 4. In this embodiment, the manifold base 3 corresponds to a first component in the present invention and the valve assembly 4 corresponds to a second component therein. In this embodiment, the manifold base 3 and a flow path block 9 of the valve assembly 4 are both made of PTFE.

A flow path 5 is formed in the manifold base 3. A flow path port 6 which communicates with the flow path 5 is formed on the upper surface of the manifold base 3. The area around the flow path port 6 constitutes a connecting portion 7 of the manifold base 3.

The valve assembly 4 includes the flow path block 9 having a flow path 8 and a cylinder 11 incorporating a piston 10. A pipe joint 12 for connecting a pipe to the flow path 8 is connected to the flow path block 9. A diaphragm valve element 13 which opens and closes the flow path 8 is provided between the flow path block 9 and the cylinder 11. The diaphragm valve element 13 is coupled to the piston 10. Pilot air enters or exits a lower chamber 15 of the cylinder 11, which is divided into an upper and a lower chamber by the piston 10, through an air port 17. As this pilot air moves the piston 10, the diaphragm valve element 13 is activated to open the flow path 8. A flow path port 18 is formed on the bottom of the flow path block 9. The area around the flow path port 18 constitutes a connecting portion 19 of the flow path block 9.

An H-shaped ring 20 as a resin seal component according to the present invention is interposed between the connecting portion 7 of the manifold base 3 and the connecting portion 19 of the flow path block 9. In this embodiment, the H-shaped ring 20 is made of PFA which is a material slightly harder than PTFE.

Figure 3:
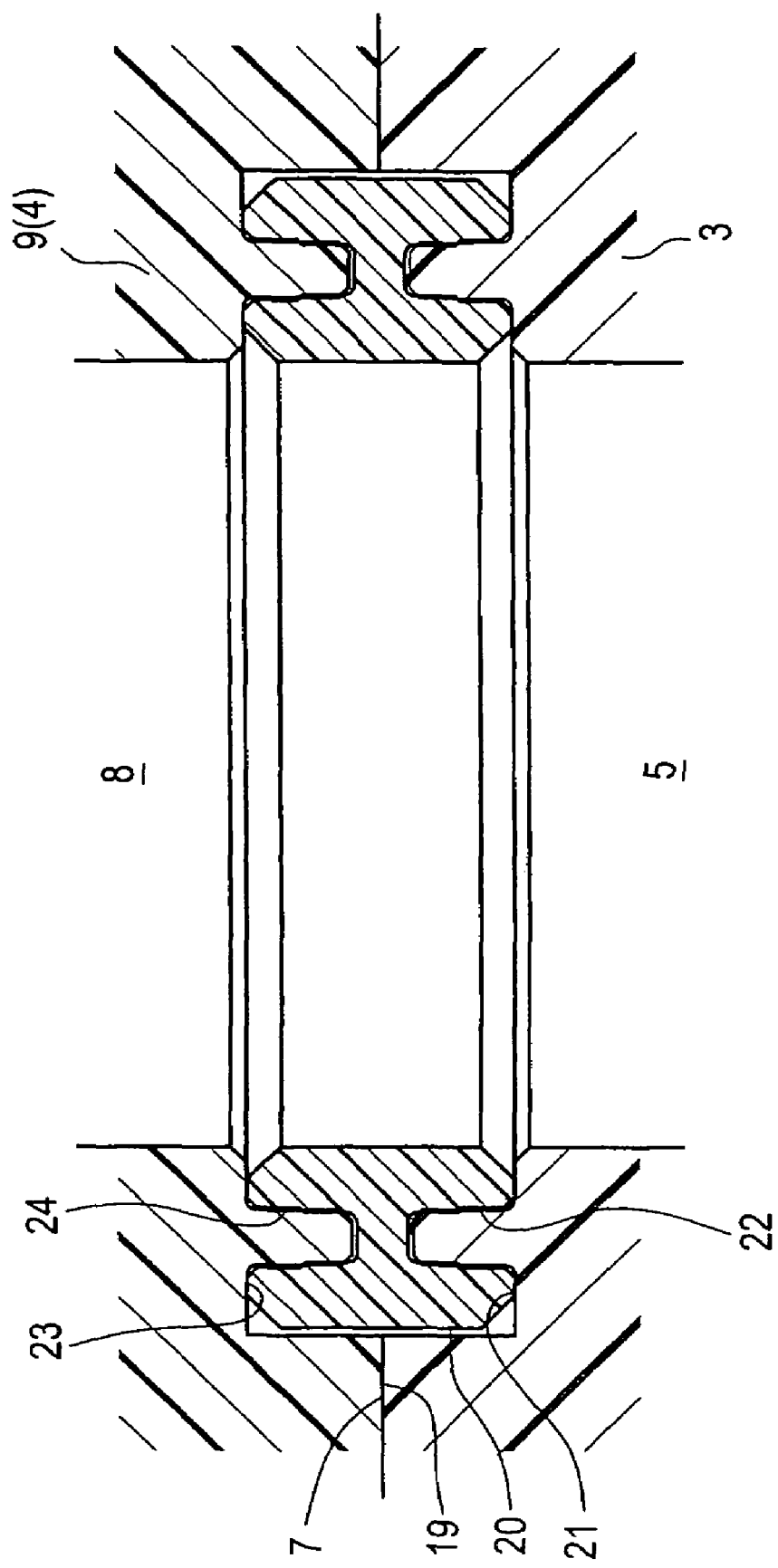
FIG. 3 is an enlarged sectional showing a connecting portion.

FIG. 3 is an enlarged sectional view showing the above connecting portions 7 and 19. Groove-ridge (concave-convex) lines 21 and 22 are formed in the connecting portion 7 of the manifold base 3 and a corresponding region of the H-shaped ring 20 where they engage with each other in a groove-ridge relationship. Likewise, groove-ridge (concave-convex) lines 23 and 24 are formed in the connecting portion 19 of the flow path block 9 and a corresponding region of the H-shaped ring 20 where they engage with each other in a groove-ridge relationship, respectively.

Figure 4:
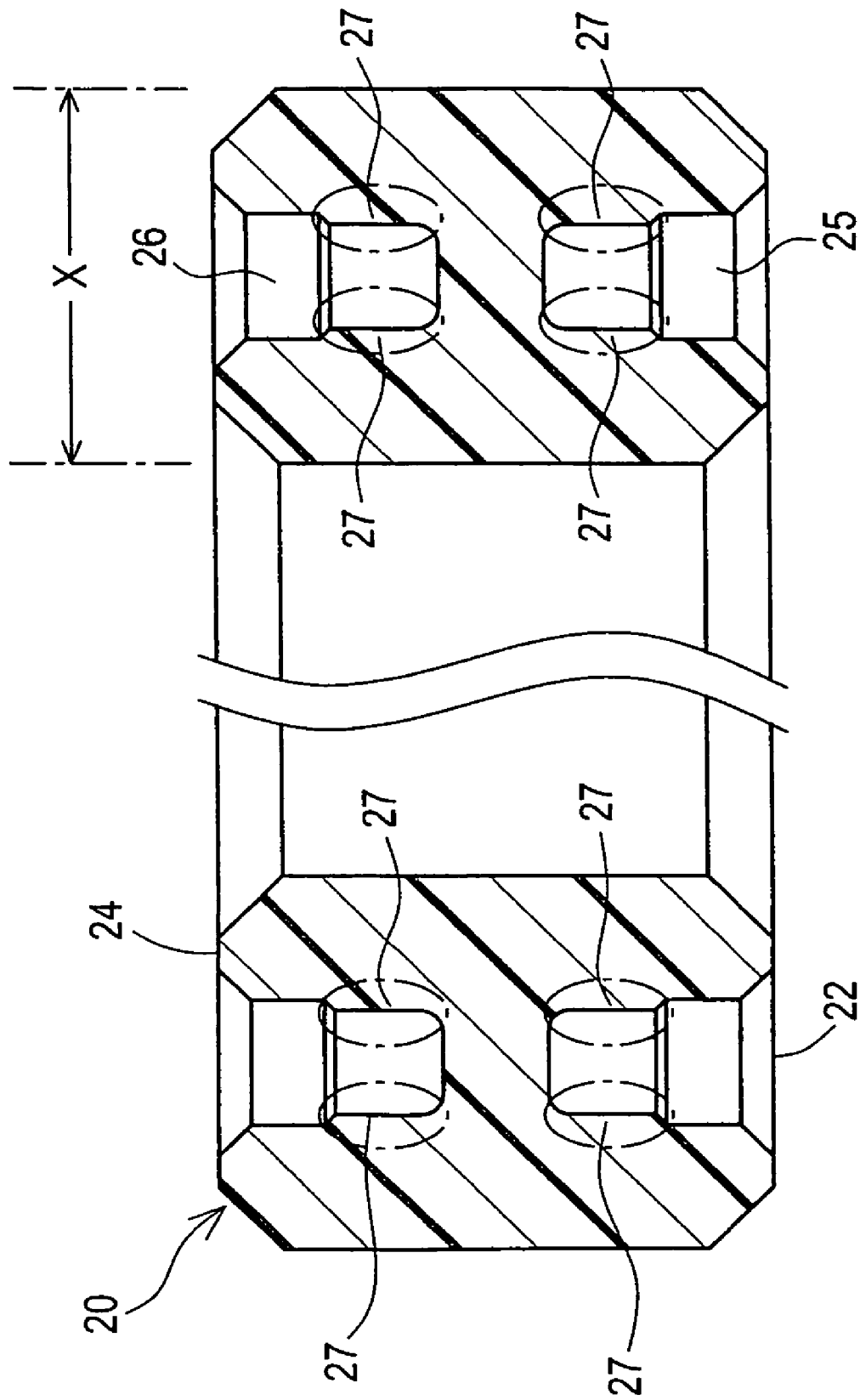
FIG. 4 is an enlarged sectional view showing an H-shaped ring.

FIG. 4 is an enlarged sectional view showing the H-shaped ring 20. This H-shaped ring 20 has an H-shaped cross section. The H-shaped ring 20 is of a radially thick ring shape and formed at its bottom with a circumferential groove 25 in the center of the wall-thickness (radial) direction as indicated by arrow X, forming a ring groove-ridge line 22. Likewise, at the top of the H-shaped ring 20, a circumferential groove 26 is formed in the center of the wall-thickness (radial) direction as indicated by arrow X, forming a ring groove-ridge line 24. In this embodiment, press-fit allowances 27 with a thickness in the wall thickness (radial) direction of the H-shaped ring 20 as enclosed by broken line in FIG. 4 are formed in the inner walls of the circumferential groove 25 and 26.

Figure 5:
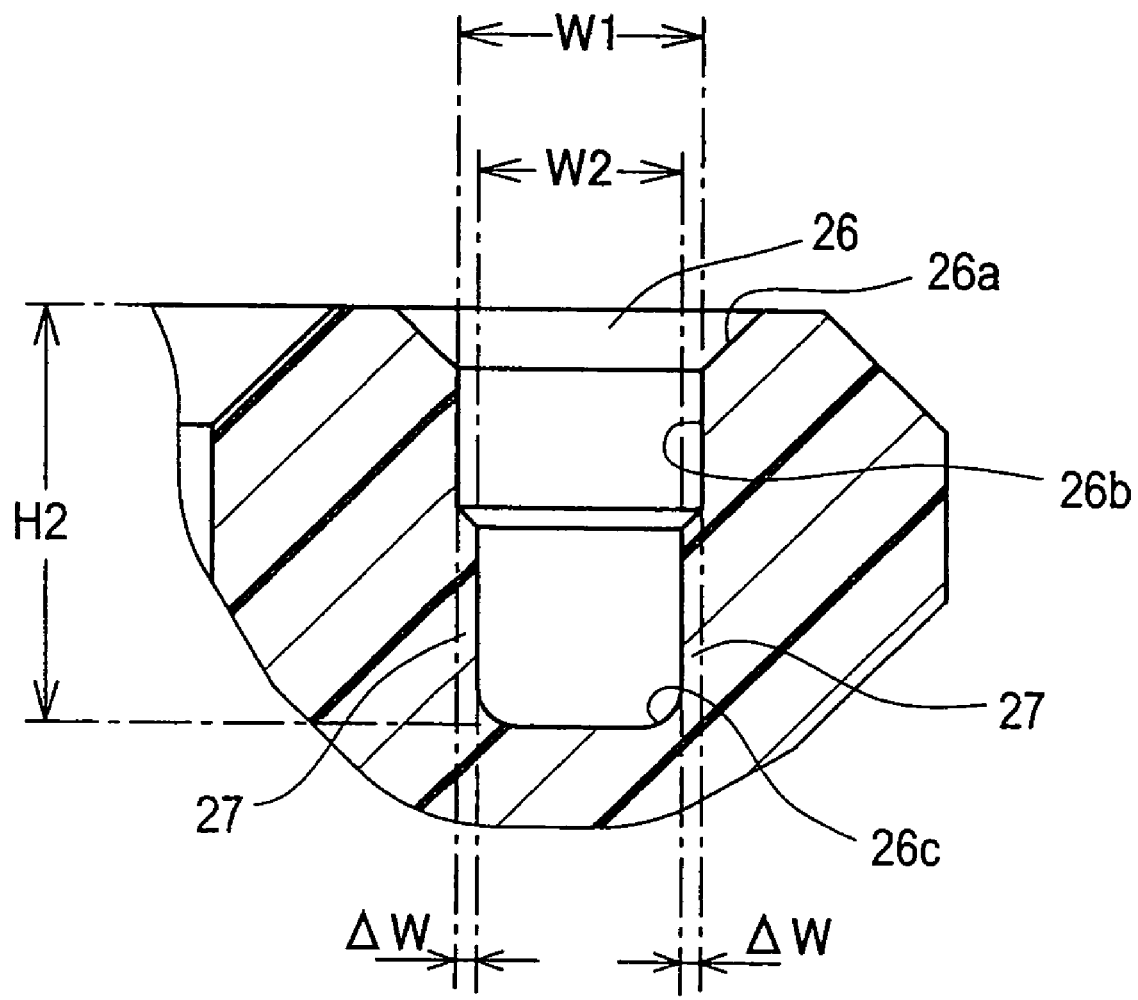
FIG. 5 is a partially sectional view showing a circumferential groove.

FIG. 5 shows a sectional shape of the upper circumferential groove 26. The circumferential groove 26 includes a tapered opening 26a and, below it, an upper portion 26b and a lower portion 26c. The width W1 of the upper portion 26b is slightly larger than the width W2 of the lower portion 26c with the width difference ΔW functioning as the press-fit allowance 27 for the lower portion 26c. In other words, the opposite inner parts of the lower portion 26c of the circumferential groove 26 are press-fit allowances 27.

Figure 6:
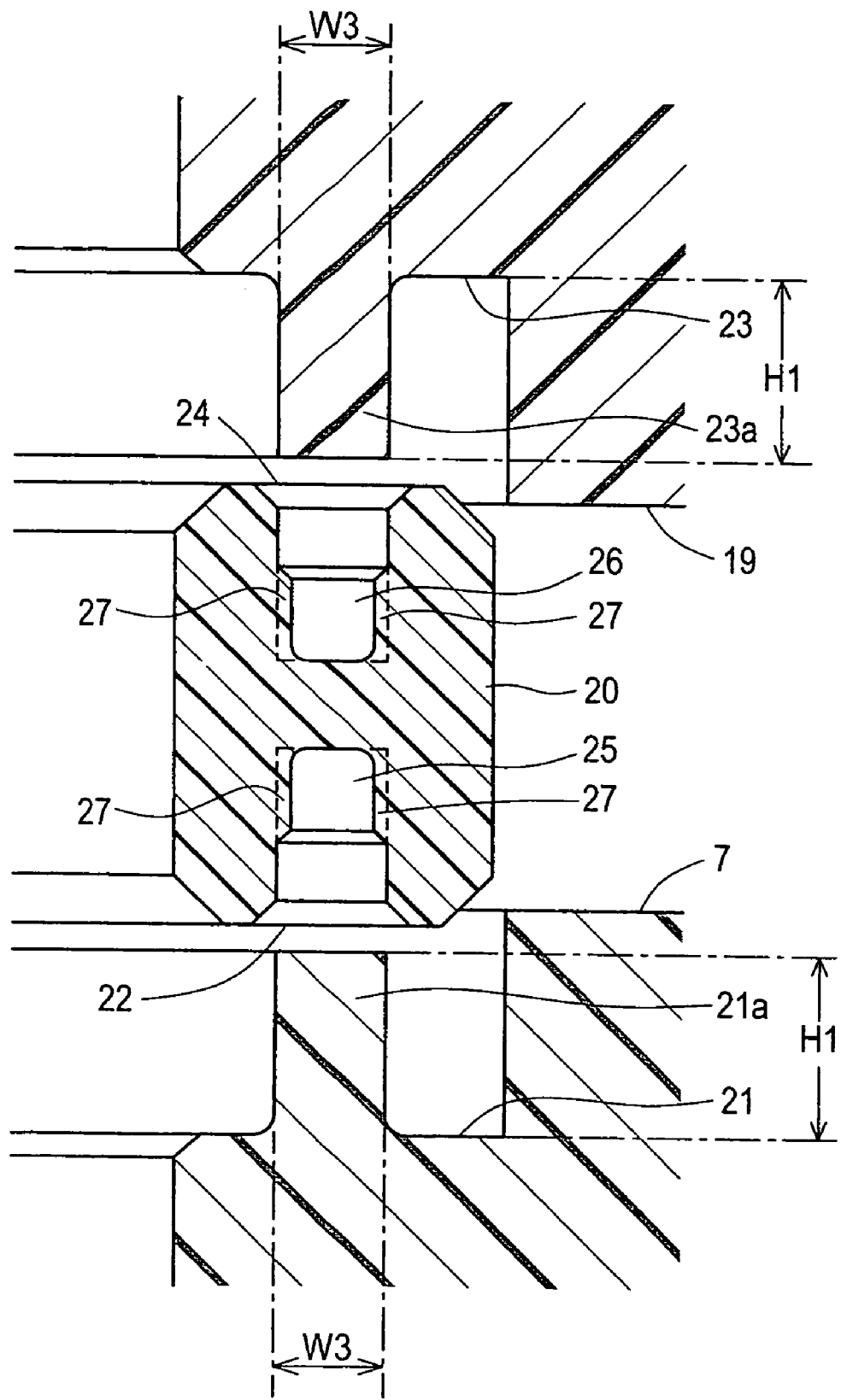
FIG. 6 is an enlarged sectional view showing a part of a groove-ridge line of each of connecting portions corresponding to the H-shaped ring.

FIG. 6 is an enlarged sectional view showing part of the groove-ridge lines 21 and 23 of the connecting portions 7 and 19 corresponding to the H-shaped ring 20. The groove-ridge line 21 of the lower connecting portion 7 has a circumferential ridge 21a which is of an annular ring shape and located in the center of the radial direction of a circumferential shoulder portion to correspond to the circumferential groove 25 of the H-shaped ring 20. The groove-ridge line 23 of the upper connecting portion 19 has a circumferential ridge 23a which is of an annular ring shape and located in the center of the radial direction of a circumferential shoulder portion to correspond to the circumferential groove 26 of the H-shaped ring 20. The width W3 of each of the circumferential ridges 21a and 23a in the wall thickness direction is designed to be equal to the width W1 of each of the upper portions 25b and 26b of the circumferential grooves 25 and 26 of the H-shaped ring 20. The seal structure for each of the connecting portions 7 and 19 is formed as mentioned above.

According to the above connection seal structure, therefore, when the connecting portion 7 of the resin manifold base 3 is to be connected with the connecting portion 19 of the resin flow path block 9, the groove-ridge line 21 of the manifold base 3 and the groove-ridge line 22 of the H-shaped ring 20 are engaged with each other and the groove-ridge line 23 of the flow path block 9 and the groove-ridge line 24 of the H-shaped ring 20 are engaged with each other. Consequently, when the circumferential ridge 21a, 23a of the groove-ridge line 21, 23, is engaged with the circumferential groove 25, 26 of the H-shaped ring 20, the circumferential ridge 21a, 23a, is tightly fitted in its wall-thickness (radial) direction due to the press-fit allowance 27 for the circumferential groove 25, 26. More specifically, the circumferential ridge 21a, 23a, is pressed from both sides in its radial direction and the area between the groove-ridge line 21, 23 and the H-shaped ring 20 is sealed. Therefore, the connecting portion 7 of the manifold base 3 and the connecting portion 19 of the flow path block 9 are securely sealed through the H-shaped ring 20. In this embodiment, since the manifold base 3, flow path block 9 and H-shaped ring 20 are made of fluorocarbon resin, the seal structure demonstrates corrosion resistance necessary for the chemical valve 1 which deals with acid or alkaline chemicals. In addition, since the manifold base 3 and the valve assembly 4 are connected only through the H-shaped ring 20 interposed between the parts 3 and 4 using no joint, the number of parts is smaller, contributing to downsizing. Also, since the seal structure does not include any welded or bonded part, removal or disassembly after their connection is possible and a maintenance work can be done on both the parts 3 and 4.

Second Embodiment

Next, a second embodiment which embodies a connection seal structure of a fluidic device according to the present invention will be described in detail referring to drawings.

In the explanation of embodiments given below, the same elements as those of the seal structure in the first embodiment are designated by the same reference numerals and their descriptions are omitted and focus is put on differences from the first embodiment.

Figure 7:
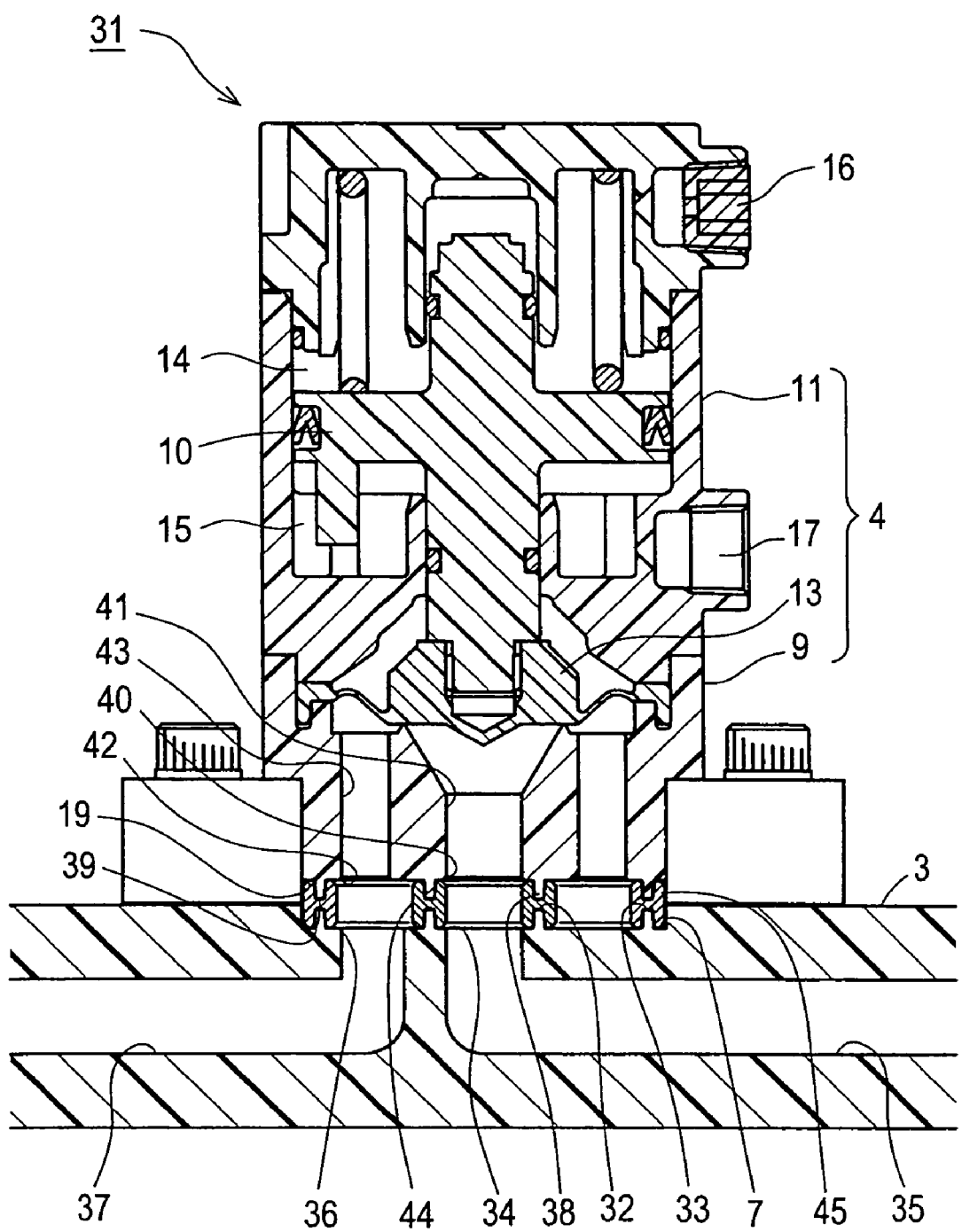
FIG. 7 is a sectional view showing a chemical valve.
Figure 8:
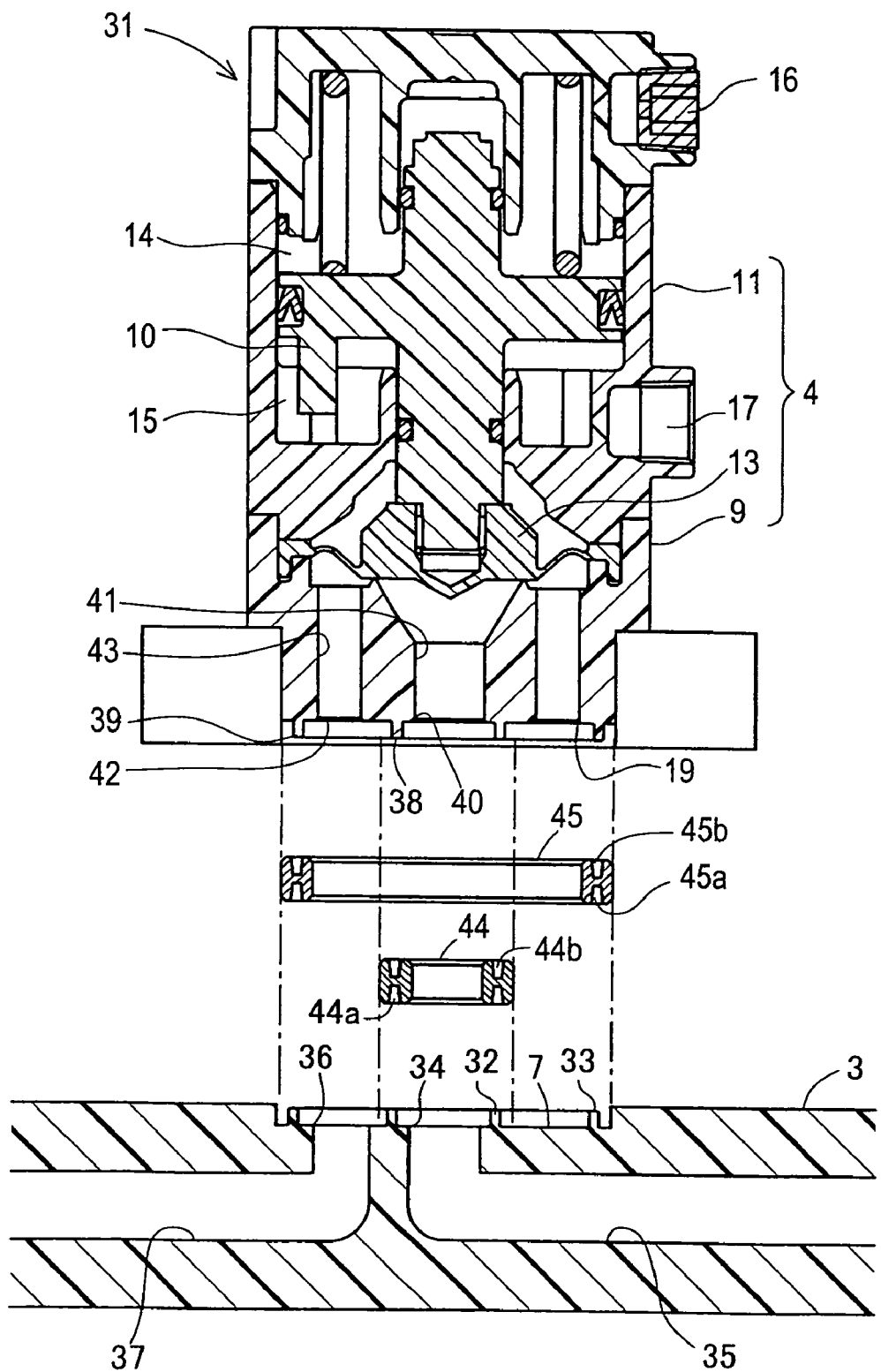
FIG. 8 is an exploded sectional view showing the chemical valve.
Figure 9:
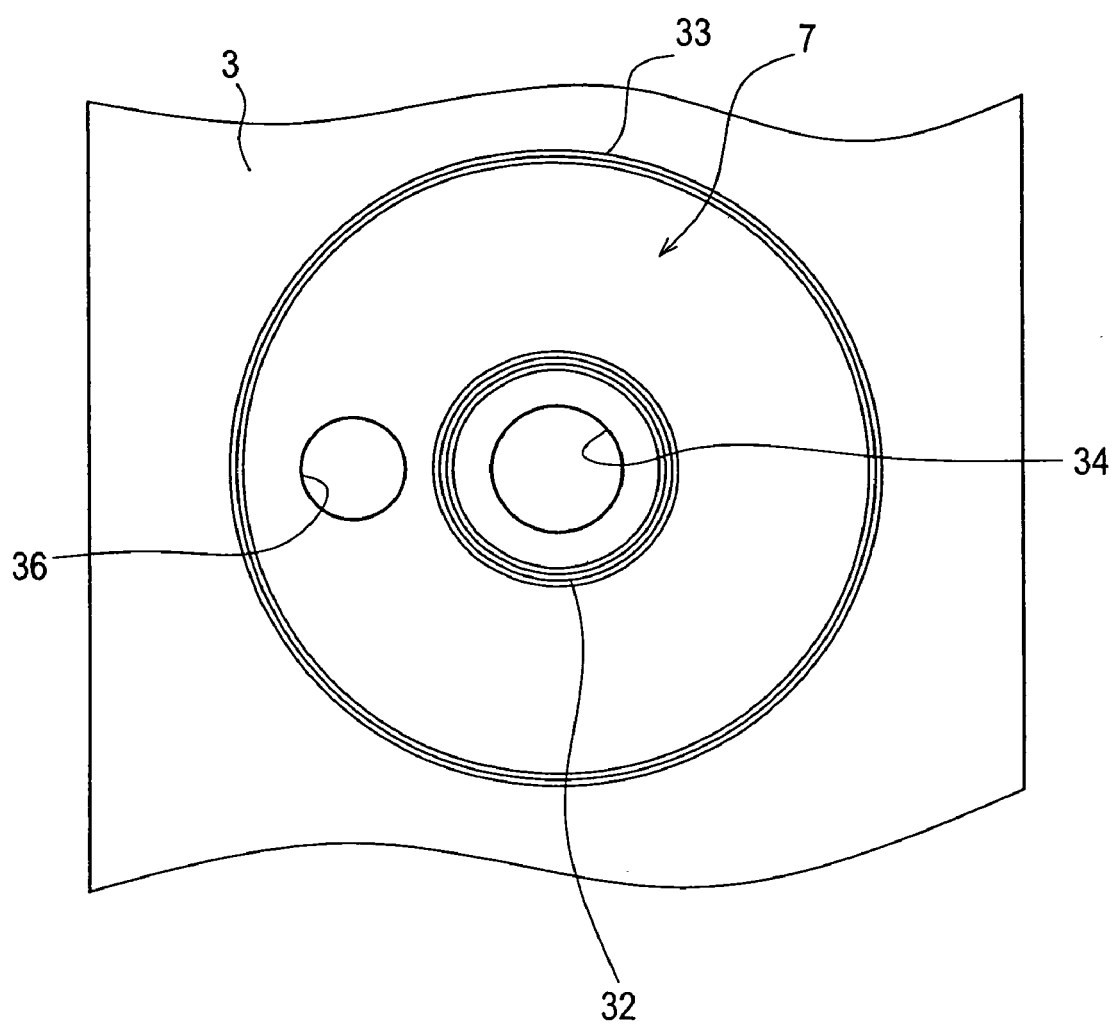
FIG. 9 is a plan view showing part of a manifold base.

FIG. 7 is a sectional view showing a manifold type chemical valve 31 as a resin device according to the present invention. FIG. 8 is an exploded sectional view of the chemical valve 31. FIG. 9 is a plan view of part of the manifold base 3. This embodiment is different from the first embodiment in that the connection seal structure is configured as a double seal structure.

More specifically, as shown in FIGS. 7 to 9, a first small-diameter groove-ridge line 32 and a first large-diameter groove-ridge line 33 which are concentric are formed in the connecting portion 7 of the manifold base 3. A first flow path port 34 is formed inside the first small-diameter groove-ridge line 32. This flow path port 34 communicates with a flow path 35 formed in the manifold base 3. A second flow path port 36 is formed between the first small-diameter groove-ridge line 32 and the large-diameter groove-ridge line 33. This flow path port 36 communicates with a flow path 37 formed in the manifold base 3 similarly.

As shown in FIGS. 7 to 9, a second small-diameter groove-ridge line 38 and a second large-diameter groove-ridge line 39 which are concentric are formed in the connecting portion 19 of the valve assembly 4 (the flow path block 9). A third flow path port 40 is formed inside the second small-diameter groove-ridge line 38. This flow path port 40 communicates with a flow path 41 formed in the flow path block 9. This flow path port 40 matches the first flow path port 34. A fourth flow path port 42 is formed between the second small-diameter groove-ridge line 38 and the second large-diameter groove-ridge line 39. This flow path port 42 also communicates with a flow path 43 formed in the flow path block 9. This flow path port 42 matches the second flow path port 36.

Here, the structure of each of the small-diameter groove-ridge lines 32 and 38 and the large-diameter groove-ridge lines 33 and 39 is basically the same as that of each of the groove-ridge lines 21 and 23 as shown in FIG. 6 and includes a circumferential ridge.

Between the two connecting portions 7 and 19, a small-diameter H-shaped ring 44 as a small-diameter seal component made of resin according to the present invention is interposed between both the small-diameter groove-ridge lines 32 and 38. A first small-diameter seal groove-ridge line 44a which engages with the first small-diameter groove-ridge line 32 in a groove-ridge relationship is formed on the lower surface of the small-diameter H-shaped ring 44. A second small-diameter seal groove-ridge line 44b which engages with the second small-diameter groove-ridge line 38 in a groove-ridge relationship is formed on the upper surface of this small-diameter H-shaped ring 44. In this embodiment, the structure of the small-diameter H-shaped ring 44 is basically the same as that of the H-shaped ring 20 as shown in FIGS. 4 to 6. Also, the structure of each of the small-diameter groove-ridge lines 44a and 44b is basically the same as that of each of the groove-ridge line 22 and 24 of the first embodiment, and includes a circumferential groove.

Between the two connecting portions 7 and 19, a large-diameter H-shaped ring 45 as a large-diameter seal component made of resin according to the present invention is interposed between both the large-diameter groove-ridge lines 33 and 39. A first large-diameter seal groove-ridge line 45a which engages with the first large-diameter groove-ridge line 33 in a groove-ridge relationship is formed on the lower surface of this large-diameter H-shaped ring 45. A second large-diameter seal groove-ridge line 45b which engages with the second large-diameter groove-ridge line 39 in a groove-ridge relationship is formed on the upper surface of this large-diameter H-shaped ring 45. In this embodiment, the structure of the large-diameter H-shaped ring 45 is basically the same as that of the H-shaped ring 20 as shown in FIGS. 4 to 6. Also, the structure of each of the large-diameter groove-ridge lines 45a and 45b is basically the same as that of each of the groove-ridge lines 22 and 24 of the first embodiment, and includes a circumferential groove.

Therefore, the seal structure in this embodiment brings about an effect similar to the effect brought about by the first embodiment.

Third Embodiment

Next, a third embodiment which embodies a connection seal structure of a fluidic device according to the present invention will be described in detail, referring to drawings.

Figure 10:
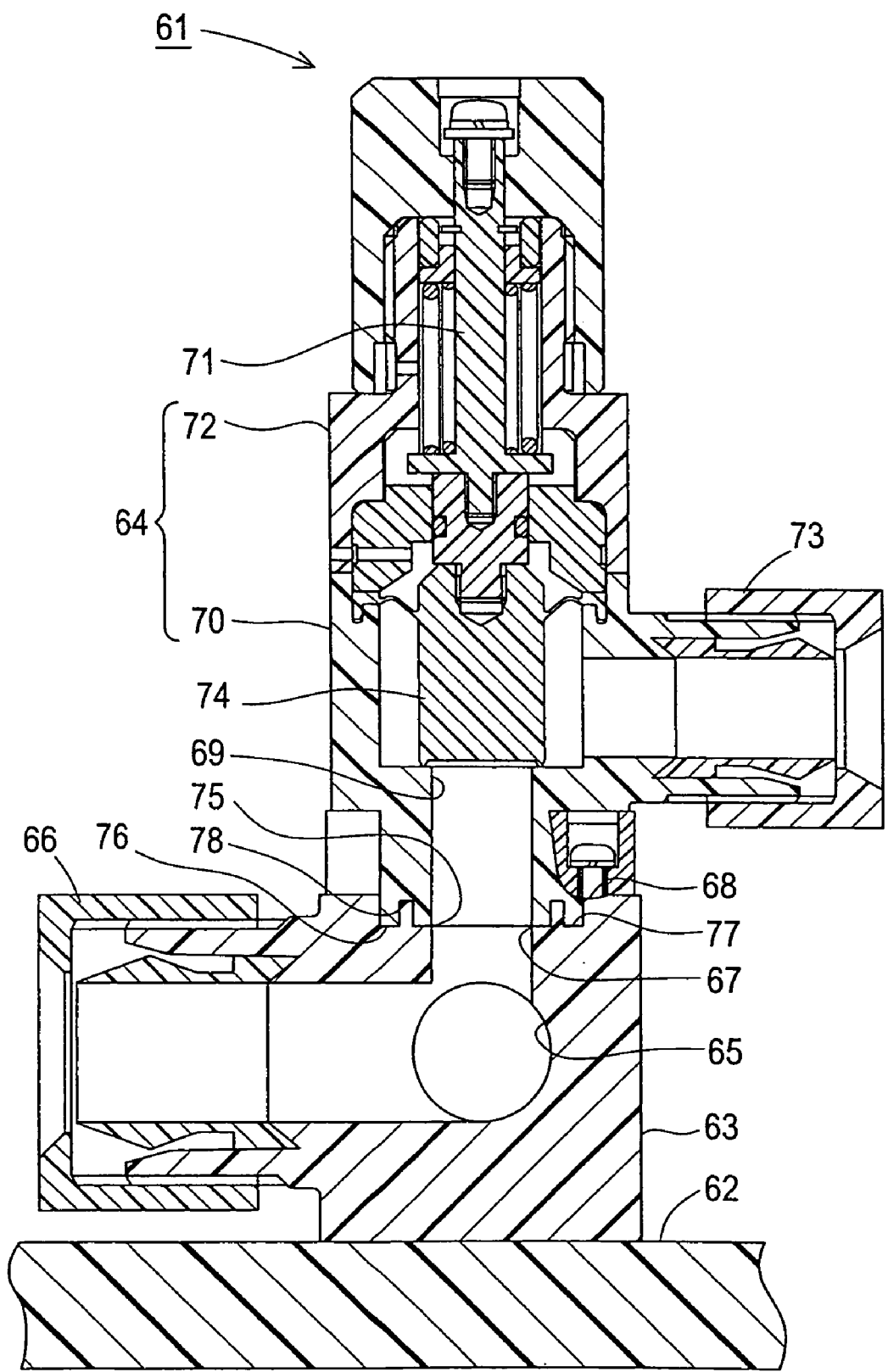
FIG. 10 is a sectional view showing a chemical valve.
Figure 11:
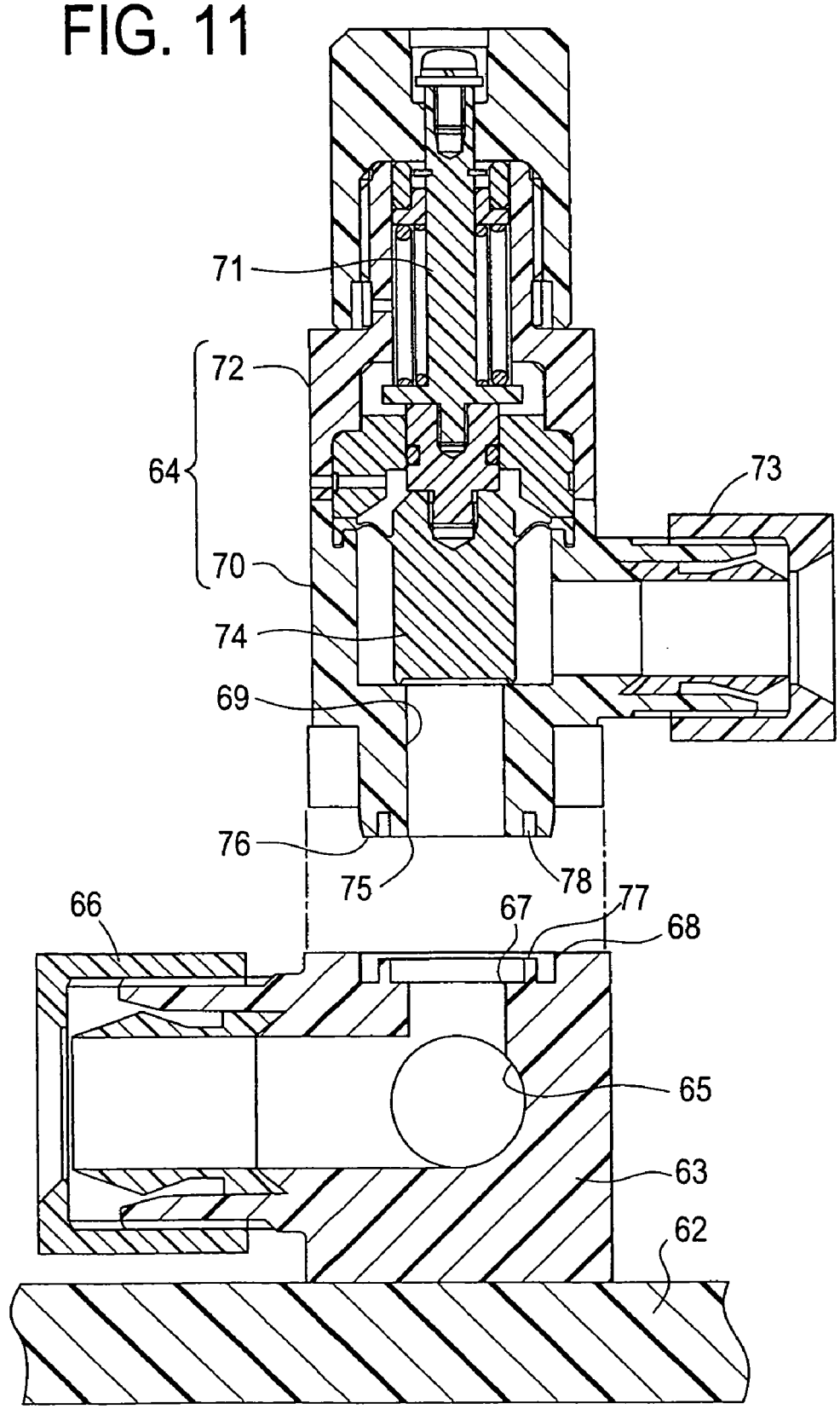
FIG. 11 is an exploded sectional view showing the chemical valve.

This embodiment is different from the first and second embodiments in that the connection seal structure has no seal component. FIG. 10 is a sectional view showing a manifold type chemical valve 61 as a fluidic device according to the present invention. FIG. 11 is an exploded sectional view of the chemical valve 61. This chemical valve 61 includes: a mounting plate 62; a resin manifold base 63 fixed on the plate 62; and a resin valve assembly 64 fixed on the base 63. The chemical valve 61 is constituted by connection of the manifold base 63 and the valve assembly 64. In this embodiment, the manifold base 63 corresponds to a first component made of resin according to the present invention and the valve assembly 64 corresponds to a second component made of resin according to the present invention. In this embodiment, the manifold body 63 and a flow path block 70 of the valve assembly 64 are both made of PTFE.

The manifold base 63 includes a flow path 65, and a pipe joint 66 for connecting a pipe to the flow path 65. A flow path port 67 is formed on the top of the base 63. The area around the flow path port 67 constitutes a connecting portion 68 of the manifold base 63.

The valve assembly 64 includes a flow path block 70 having a flow path 69, a manual actuator 72 incorporating a shaft 71, and others. A pipe joint 73 for connecting a pipe to the flow path 69 is connected to the flow path block 70. A diaphragm valve element 74 which opens and closes the flow path 69 is provided between the flow path block 70 and the manual actuator 72. The diaphragm valve element 74 is coupled to the shaft 71. In this embodiment, the shaft 71 is moved by turning a manual knob coupled to a screw to activate the diaphragm valve element 74 to open or close the flow path 69. A flow path port 75 is formed on the bottom of the flow path block 70. The area around the flow path port 75 constitutes a connecting portion 76 of the flow path block 70.

Figure 12:
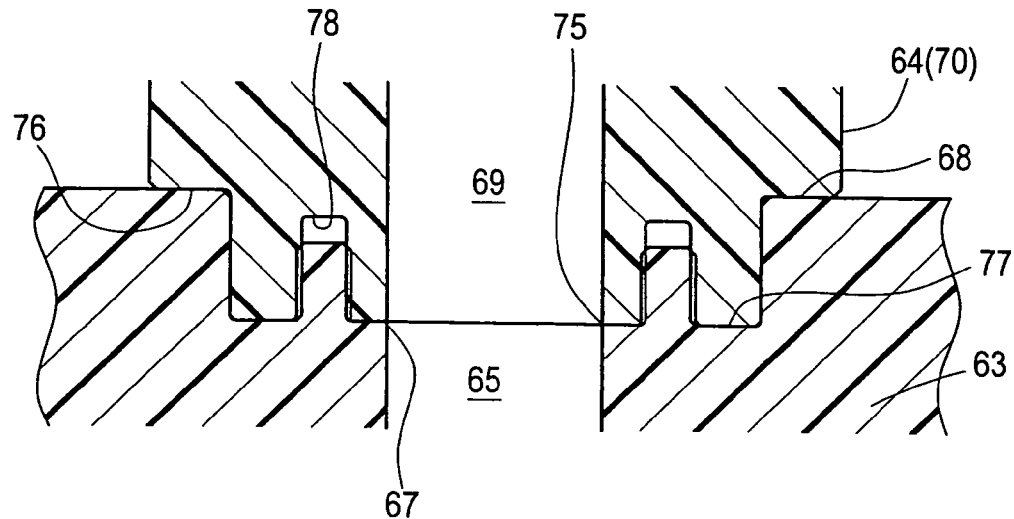
FIG. 12 is an enlarged sectional view showing a connecting portion.
Figure 13:
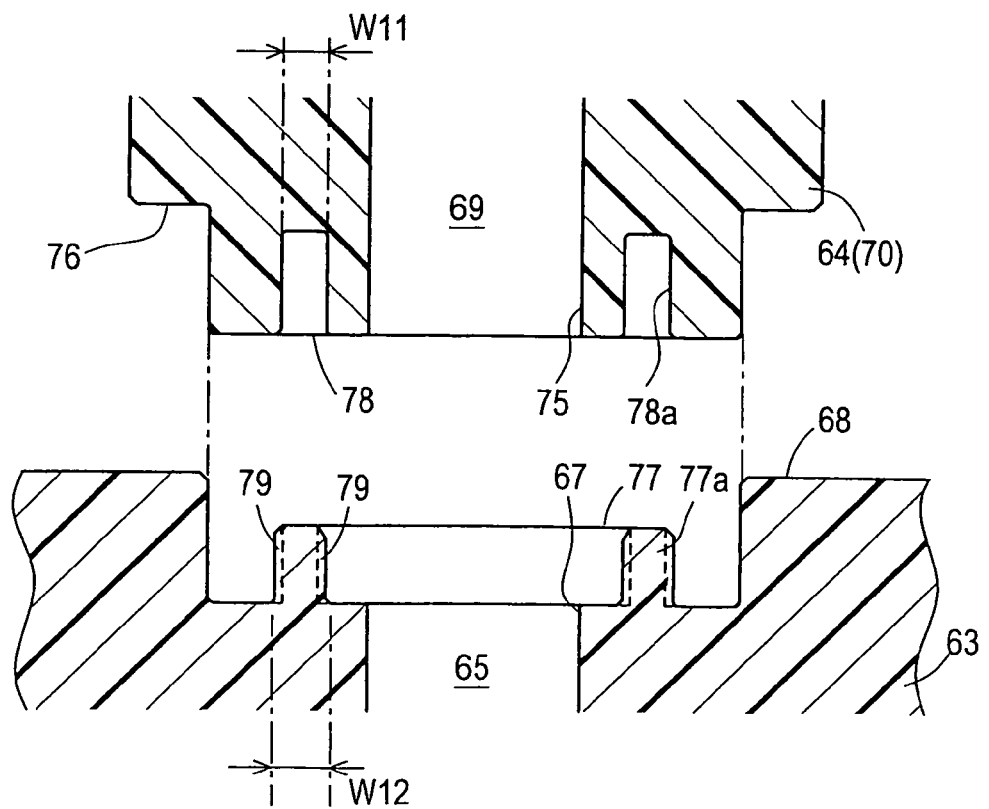
FIG. 13 is an exploded enlarged sectional view showing the connecting portion.

FIG. 12 is an enlarged sectional view showing the above connecting portions 68 and 76. FIG. 13 is an enlarged sectional view showing the connecting portions 68 and 76 in exploded form. Groove-ridge lines 77 and 78 which engage with each other in a groove-ridge relationship are formed in the connecting portion 68 of the manifold base 63 and the connecting portion 76 of the flow path block 70, respectively. In this embodiment, the groove-ridge line 77 of the manifold base 63 has a circumferential ridge 77a in an outer area of a circular groove formed around the flow path port 67. Also, the groove-ridge line 78 of the flow path block 70 has a circumferential groove 78a in an outer area of a cylindrical ridge formed around the flow path port 75.

In this embodiment, press-fit allowances 79 are provided on both sides in the wall-thickness (radial) direction of the circumferential ridge 77a of the groove-ridge line 77. More specifically, in this embodiment, the width W12 of the circumferential ridge 77a of the groove-ridge line 77 is slightly larger than the width W11 of the circumferential groove 78a of the groove-ridge line 78. The difference between the widths W11 and W12 functions as a press-fit allowance 79.

Therefore, according to the connection seal structure in this embodiment, by engagement between the groove-ridge line 77 of the connecting portion 68 of the resin manifold base 63 and the groove-ridge line 78 of the connecting portion 76 of the resin flow path block 70, the groove-ridge lines 77 and 78 are tightly fitted due to press-fit allowances 79. Here, the circumferential ridge 77a fits into the circumferential groove 78a while the circumferential ridge 77a is tightly fitted in its wall-thickness (radial) direction due to the press-fit allowances 79. More specifically, the circumferential ridge 77a is pressed from both sides in its radial direction and the area between the groove-ridge lines 77 and 78 is sealed. Therefore, the connecting portion 68 of the manifold base 63 and the connecting portion 76 of the flow path block 70 are securely sealed. In this embodiment, since the manifold base 63 and flow path block 70 are made of fluorocarbon resin, the seal structure demonstrates corrosion resistance necessary for the chemical valve 61 which deals with acid or alkaline chemicals. In addition, since the manifold base 63 and the valve assembly 64 are connected using neither a joint nor a seal component like an H-shaped ring, the number of parts is smaller, contributing to downsizing. Also, since the seal structure does not include any welded or bonded part, removal or disassembly after their connection is possible and maintenance work can be done on both the parts 63 and 64.

Fourth Embodiment

Next, a fourth embodiment which embodies a connection seal structure of a fluidic device according to the present invention will be described in detail, referring to drawings.

Figure 14:
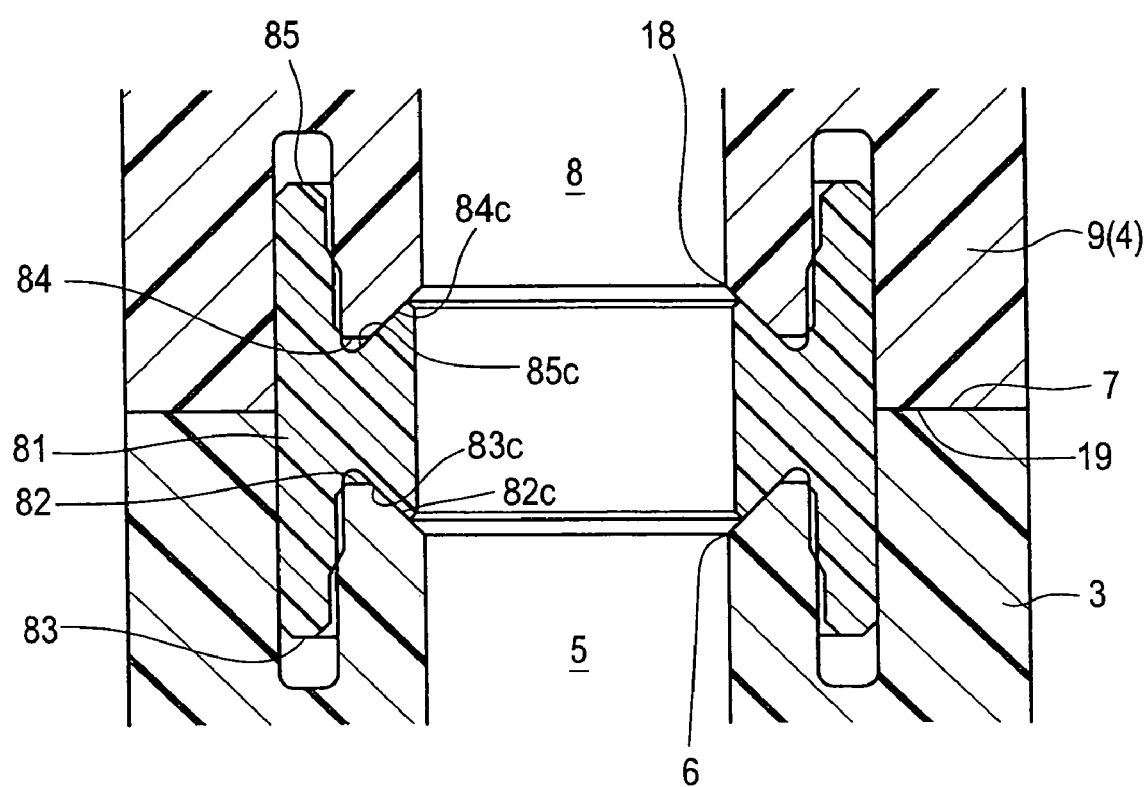
FIG. 14 is an enlarged sectional view showing a connecting portion.
Figure 15:
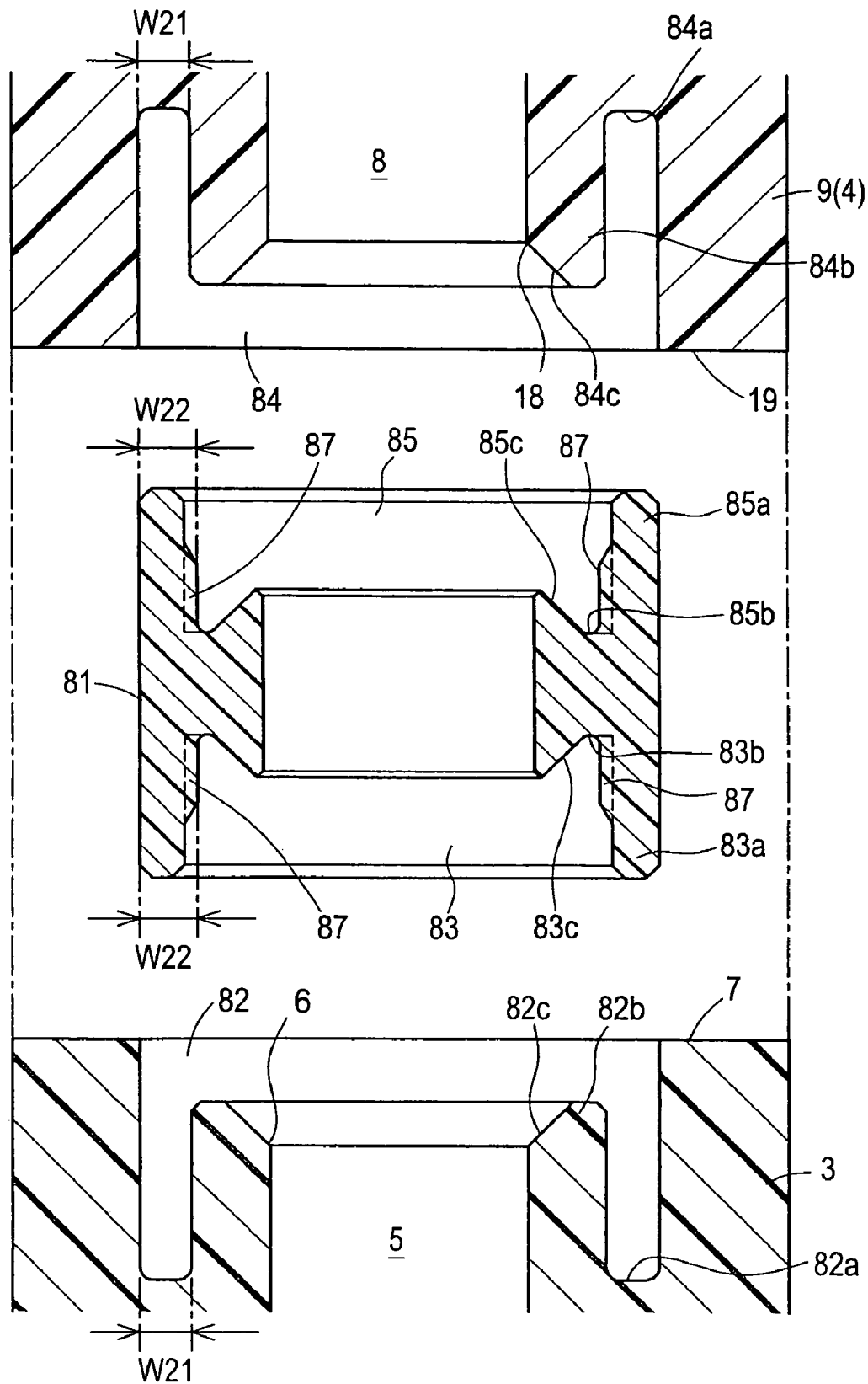
FIG. 15 is an exploded enlarged sectional view showing the connecting portion.

This embodiment is a variation of the connection seal structure in the first embodiment. FIG. 14 is an enlarged sectional view showing the connecting portion 7 of a manifold base 3 and connecting portion 19 of a flow path block 9. FIG. 15 is an enlarged sectional view showing the connecting portions 7 and 19 in exploded form. A resin ring seal component 81 is interposed between the connecting portion 7 of the resin manifold base 3 and the connecting portion 19 of the resin flow path block 9. Groove-ridge lines 82 and 83 are formed in the connecting portion 7 of the manifold base 3 and the corresponding region of the seal component 81 respectively so that they engage with each other in a groove-ridge (concave-convex) relationship. Groove-ridge lines 84 and 85 are formed in the connecting portion 19 of the flow path block 9 and the corresponding region of the seal component 81 respectively so that they engage with each other in a groove-ridge (concave-convex) relationship. In this embodiment, the groove-ridge line 82 of the manifold base 3 is so formed as to include a circumferential groove 82a formed around the flow path port 6 and a sleeve 82b formed inside the circumferential groove 82a and around the flow path port 6. The opening of the sleeve 82b continuous with the flow path port 6 has a tapered surface 82c. Also, the groove-ridge line 84 of the flow path block 9 is so formed as to include a circumferential groove 84a formed around the flow path port 18 and a sleeve 84b formed inside the circumferential groove 84a and around the flow path port 18. The opening of the sleeve 84b continuous with the flow path port 18 has a tapered surface 84c.

The groove-ridge line 83 of the seal component 81 which corresponds to the groove-ridge line 82 of the manifold base 3 is so formed as to include a circumferential ridge 83a press-fitted into the circumferential groove 82a, and a circumferential groove 83b inside the circumferential ridge 83a, into which the sleeve 82b is press-fitted. The circumferential groove 83b has a tapered surface 83c to match the tapered surface 82c of the sleeve 82b. Likewise, the groove-ridge line 85 of the seal component 81 which corresponds to the groove-ridge line 84 of the flow path block 9 is so formed as to include a circumferential ridge 85a press-fitted into the circumferential groove 84a, and a circumferential groove 85b inside the circumferential ridge 85a, into which the sleeve 84b is press-fitted. The circumferential groove 85b has a tapered surface 85c to match the tapered surface 84c of the sleeve 84b.

In this embodiment, a press-fit allowance 87 is provided inside the seal component 81 in the wall-thickness (radial) direction of the circumferential ridges 83a and 85a. More specifically, in this embodiment, the width W22 of the base part of each of the circumferential ridges 83a and 85a of the seal component 81 is slightly larger than the width W21 of each of the circumferential grooves 82a and 84a of the groove-ridge lines 82 and 84. The difference between the widths W21 and W22 functions as a press-fit allowance 87 for the circumferential ridges 83a and 85a.

In this embodiment, accordingly, when the groove-ridge line 82 of the resin manifold base 3 and the groove-ridge line 83 of the seal component 81 engage with each other, the tapered surface 82c of the sleeve 82b and the tapered surface 83c of the circumferential groove 83b are pressed against each other and thus the press-fit allowance 87 for the circumferential ridge 83a is tightly fitted into the circumferential groove 82a. Likewise, when the groove-ridge line 84 of the flow path block 9 and the groove-ridge lines 85 of the seal component 81 engage with each other, the tapered surface 84c of the sleeve 84b and the tapered surface 85c of the circumferential groove 85b are pressed against each other and thus the press-fit allowance 87 for the circumferential ridge 85a is tightly fitted into the circumferential groove 84a. Consequently, the connecting portion 7 of the manifold base 3 and the connecting portion 19 of the valve assembly 4 are sealed mutually through the seal component 81. As a result, this embodiment brings about an effect similar to the effect brought about by the first embodiment.

Fifth Embodiment

Next, a fifth embodiment which embodies a connection seal structure of a fluidic device according to the present invention will be described in detail referring to drawings.

Figure 16:
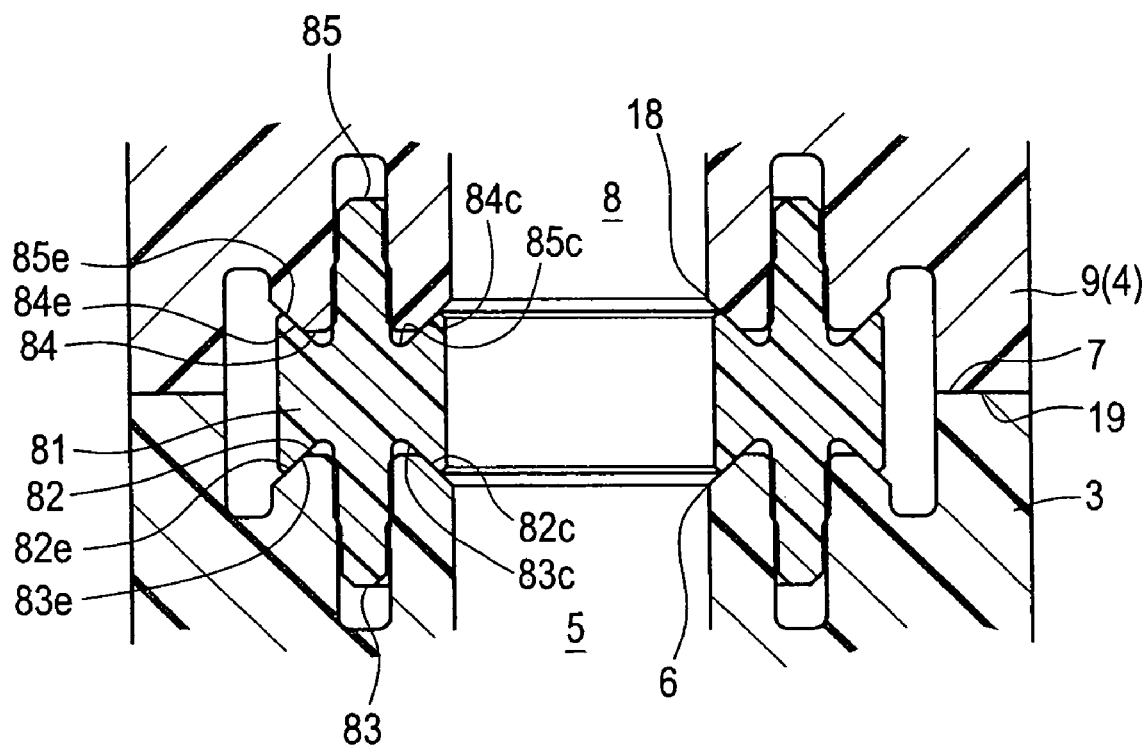
FIG. 16 is an enlarged view showing a connecting portion.
Figure 17:
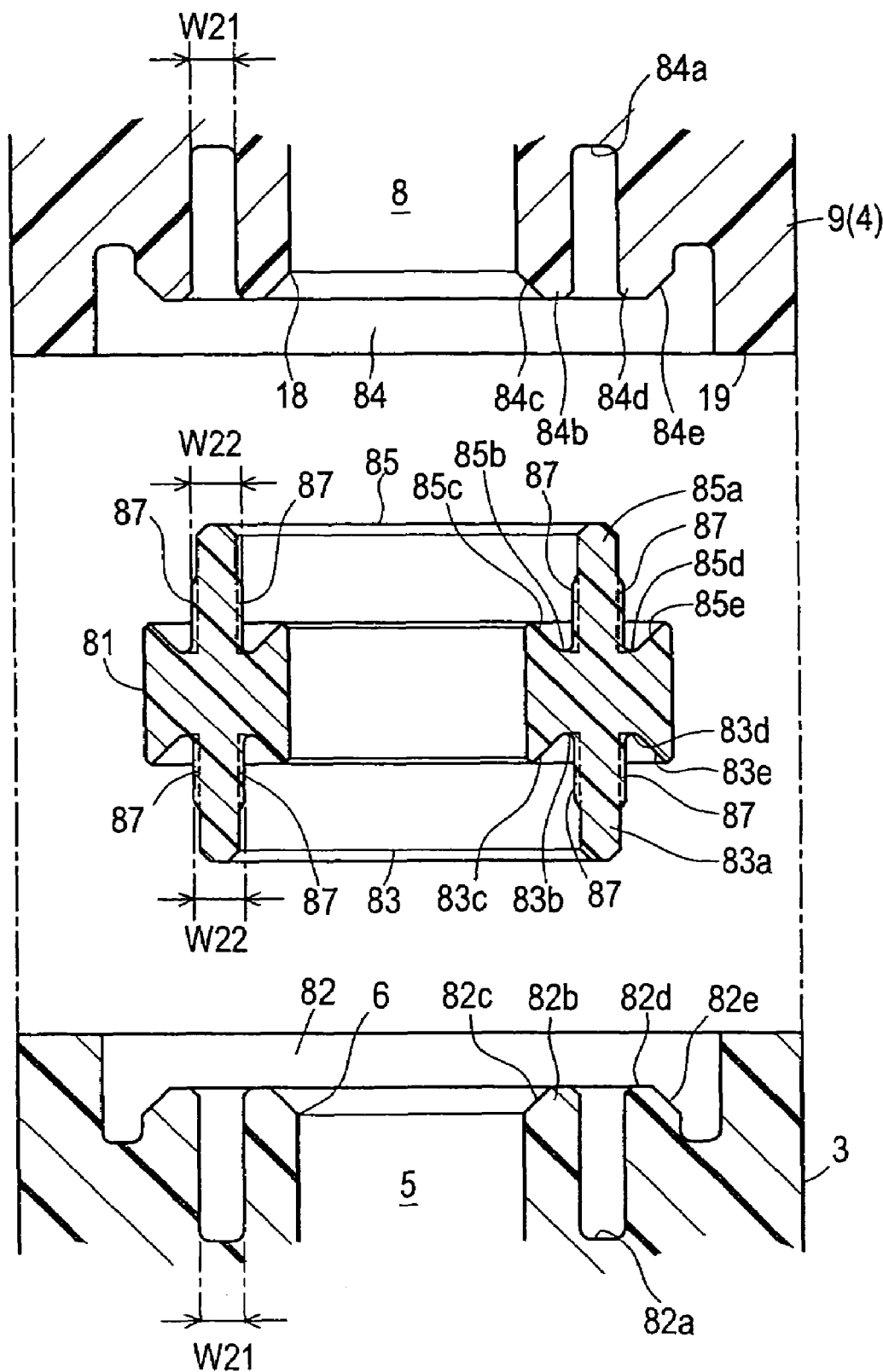
FIG. 17 is an exploded enlarged view showing the connecting portion.

This embodiment is a variation of the connection seal structure in the fourth embodiment. FIG. 16 is an enlarged sectional view showing the connecting portion 7 of a manifold base 3 and the connecting portion 19 of a flow path block 9. FIG. 17 is an enlarged sectional view showing the connecting portions 7 and 19 in exploded form. This embodiment is different from the fourth embodiment in terms of the shape of the groove-ridge lines 82 and 84 of the manifold base 3 and flow path block 9 and the shape of the groove-ridge lines 83 and 85 of the seal component 81.

More specifically, in this embodiment, the groove-ridge line 82 of the manifold base 3 and the groove-ridge line 84 of the flow path block 9 include not only sleeves 82b and 84b respectively but also outer sleeves 82d and 84d located outside them. Tapered surfaces 82e and 84e are formed on the peripheries of the outer sleeves 82d and 84d respectively. On the other hand, in this embodiment, the groove-ridge lines 83 and 85 of the seal component 81 include not only circumferential grooves 83b and 85b but also outer circumferential grooves 83d and 85d located outside the circumferential ridges 83a and 85a. Tapered surfaces 83e and 85e are formed on the peripheries of the circumferential grooves 83d and 85d respectively. Press fit allowances 87 are provided outside the circumferential ridges 83a and 85a in their wall-thickness (radial) direction.

In this embodiment, accordingly, when the groove-ridge line 82 of the manifold base 3 and the groove-ridge line 83 of the seal component 81 engage with each other, the tapered surface 82c of the sleeve 82b and the tapered surface 83c of the circumferential groove 83b, and the tapered surface 82e of the outer sleeve 82d and the tapered surface 83e of the outer circumferential groove 83d, are pressed against each other and thus the press-fit allowance 87 for the circumferential ridge 83a is tightly fitted into the circumferential groove 82a. Likewise, when the groove-ridge line 84 of the flow path block 9 and the groove-ridge line 85 of the seal component 81 engage with each other, the tapered surface 84c of the sleeve 84b and the tapered surface 85c of the circumferential groove 85b, and the tapered surface 84e of the outer sleeve 84d and the tapered surface 85e of the outer circumferential groove 85d, are pressed against each other and thus the press-fit allowance 87 for the circumferential ridge 85a is tightly fitted into the circumferential groove 84a. Consequently, the connecting portions 7 and 19 of the manifold base 3 and the valve assembly 4 are sealed mutually through the seal component 81. As a result, this embodiment also brings about an effect similar to the effect brought about by the first embodiment.

Sixth Embodiment

Next, a sixth embodiment which embodies a connection seal structure of a fluidic device according to the present invention will be described in detail referring to drawings.

Figure 18:
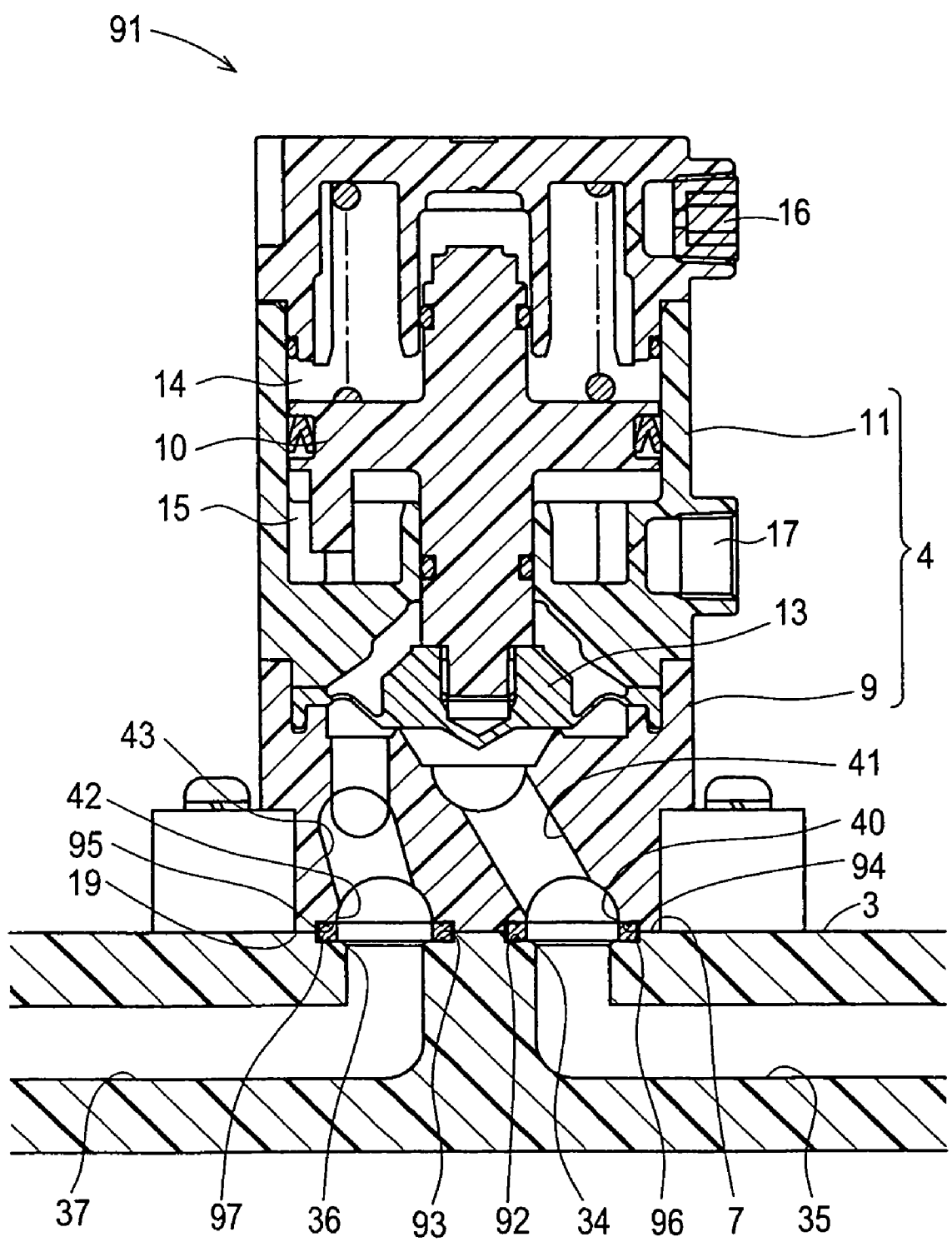
FIG. 18 is a sectional view showing a chemical valve.
Figure 19:
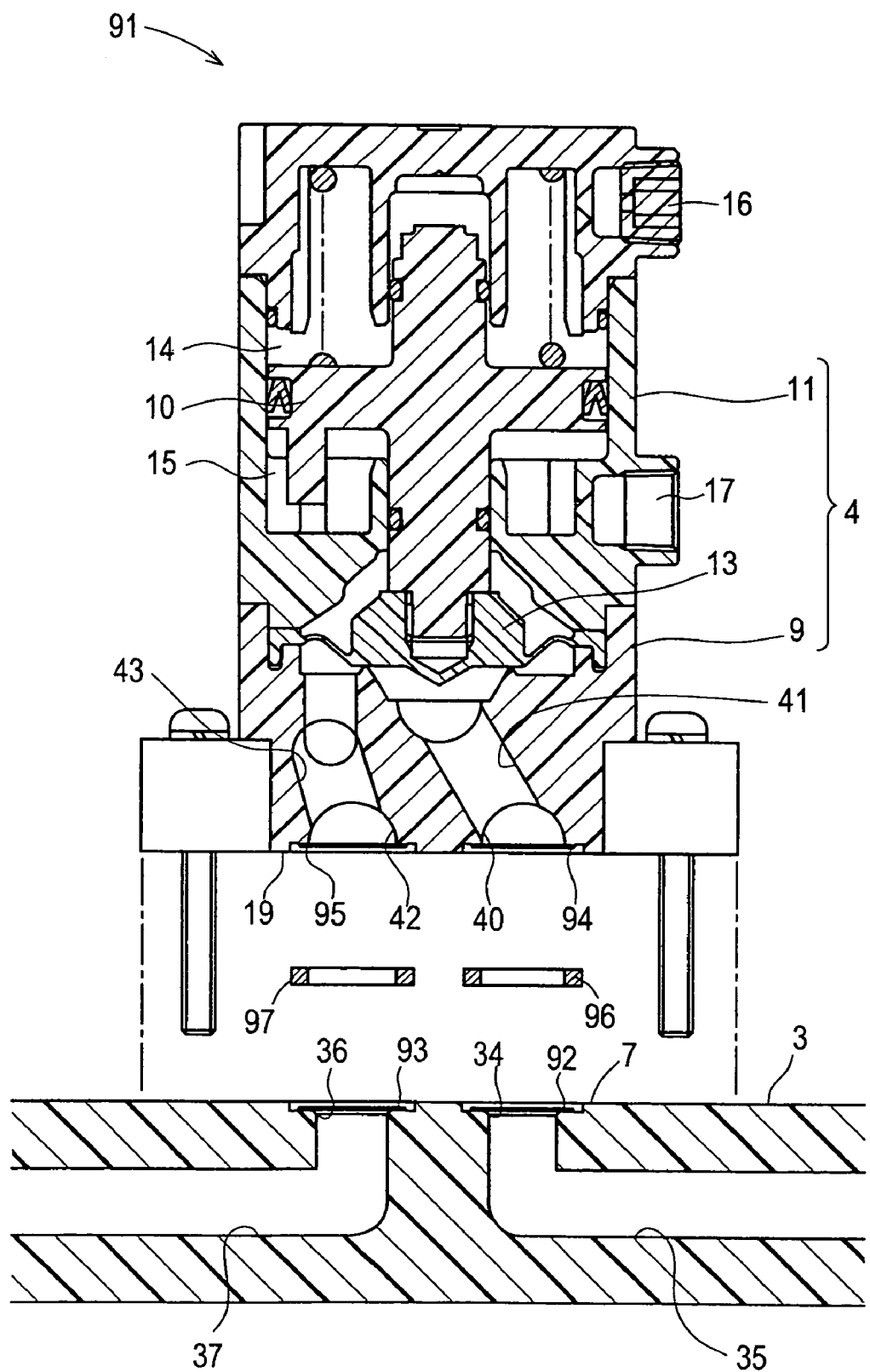
FIG. 19 is an exploded enlarged view showing the chemical valve.

The connection seal structure in this embodiment is different from the connection seal structures of the first to fifth embodiments in that the first component and the second component are connected not by engaging them in a groove-ridge relationship through an interposed seal component but by pressing the first component and the second component against each other through an interposed annular seal component in the axial direction. FIG. 18 is a sectional view showing a manifold type chemical valve 91. FIG. 19 is an exploded sectional view showing the chemical valve 91. A first groove 92 and a second groove 93 are formed in the connecting portion 7 of the manifold base 3. A first flow path port 34 communicating with a flow path 35 is formed inside the first groove 92. A second flow path port 36 communicating with a flow path 37 is formed inside the second groove 93.

A third groove 94 and a fourth groove 95 are formed in the connecting portion 19 of the valve assembly 4 (the flow path block 9). A third flow path port 40 communicating with a flow path 41 is formed inside the third groove 94. This flow path port 40 matches a first flow path port 34. A fourth flow path port 42 communicating with a flow path 43 is formed inside the fourth groove 95. This flow path port 42 matches a second flow path port 36.

Between the two connecting portions 7 and 19, an annular seal component 96 made of resin according to the present invention is interposed between the first groove 92 and the third groove 94. Likewise, an annular seal component 97 made of resin according to the present invention is interposed between the second groove 93 and the fourth groove 95.

Figure 20:
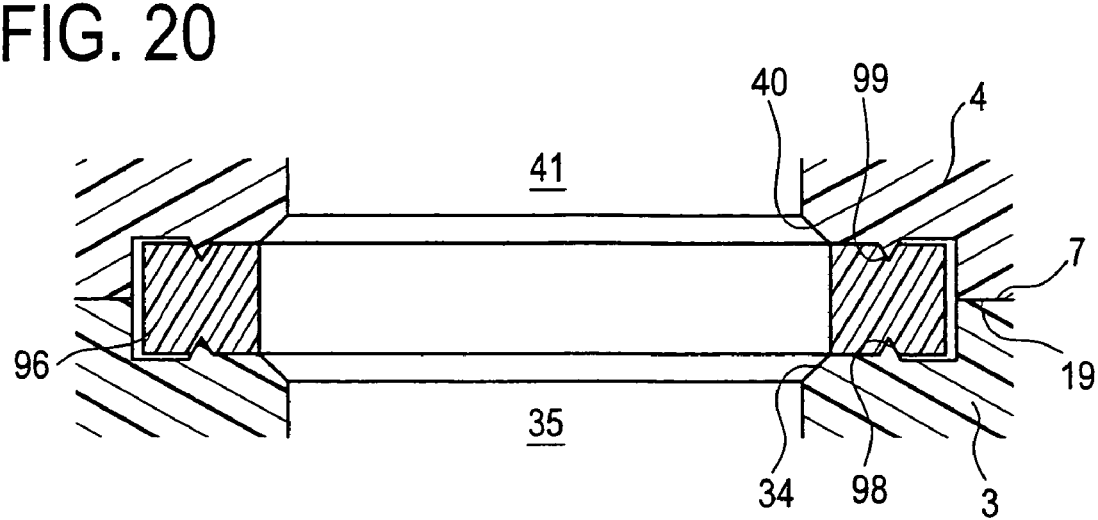
FIG. 20 is an enlarged sectional view showing a connecting portion.
Figure 21:
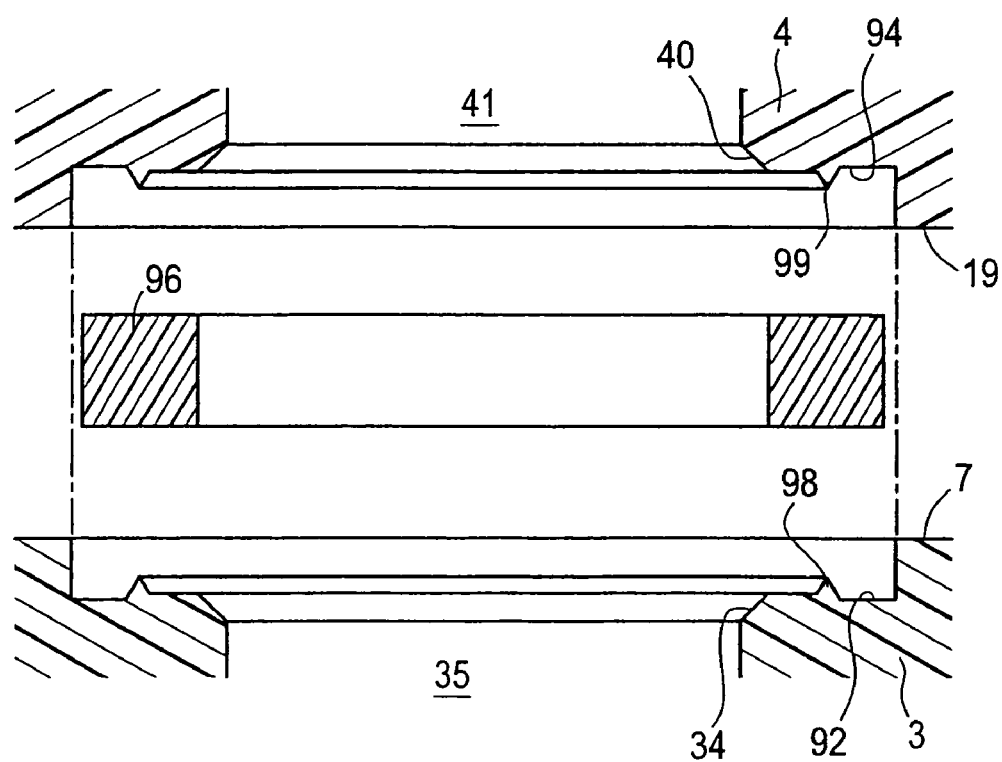
FIG. 21 is an exploded enlarged view showing the connecting portion.

FIG. 20 is an enlarged sectional view showing the first and third grooves 92, 94 in the connecting portions 7 and 19. FIG. 21 is an enlarged sectional view showing the first and third grooves 92 and 94 in exploded form. Since the second and fourth grooves 93 and 95 are structurally the same as the first and third grooves 92 and 94, their descriptions are omitted here. Circumferential protrusions 98 and 99 are formed on the bottom faces of the first and third grooves 92 and 94, respectively. In this embodiment, the circumferential protrusions 98 and 99 have a sharp-tipped sectional shape. In this embodiment, when the connecting portion 7 of the manifold base 3 and the connecting portion 19 of the valve assembly 4 are pressed against each other in the axial direction with annular seal components 96 and 97 interposed, the circumferential protrusions 98 and 99 break or bite into the bottom and top faces of the annular seal components 96 and 97 so that they are connected.

In other words, according to the above connection seal structure, when the connecting portion 7 of the manifold base 3 made of fluorocarbon resin and the connecting portion 19 of the valve assembly 4 made of fluorocarbon resin are connected, the fluorocarbon-resin annular seal components 96 and 97 are pressed against the bottom faces of the grooves 92 to 95 of the connecting portions 7 and 19. Along with this, the circumferential protrusion 98 in the grooves 92 and 93 of the manifold base 3 and the circumferential protrusion 99 in the grooves 94 and 95 of the valve assembly 4 break or bite into the bottom and top faces of the interposed annular seal components 96 and closely fit into them, as shown in FIG. 20. Consequently, the connecting portion 7 of the manifold base 3 and the connecting portion 19 of the valve assembly 4 are mutually sealed through the annular seal components 96 and 97. Since the manifold base 3, valve assembly 4 and annular seal components 96 and 97 are made of fluorocarbon resin, the seal structure demonstrates the corrosion resistance necessary for the chemical valve 91 which deals with acid or alkaline chemicals. In addition, the seal structure eliminates the need for space for a joint or joint formation, contributing to downsizing. Also, since the seal structure does not include any welded or bonded part, removal or disassembly after connection is possible and thus maintenance work can be done on the manifold base 3 and valve assembly 4.

The present invention is not limited to the above embodiments but may also be embodied as explained below without departing from the scope thereof.

In the connection seal structure according to the second embodiment, the double seal structure is embodied as follows: a small-diameter seal component and a large-diameter seal component are interposed between the first component and the second component. However, the connection double-seal structure may be embodied in another form in which no seal component is interposed between the first component and the second component as in the third embodiment.

For example, like the second embodiment, in the connection seal structure of the chemical valve constituted by connection of the manifold base and the body, a first small-diameter groove-ridge line and a first large-diameter groove-ridge line which are concentric are formed in the connecting portion of the manifold base, and a first flow path port is formed inside the first small-diameter groove-ridge line. A second flow path port is formed between the first small-diameter groove-ridge line and the first large-diameter groove-ridge line. Also, a second small-diameter groove-ridge line and a second large-diameter groove-ridge line which are concentric are formed in the connecting portion of the body and a third flow path port which matches the first flow path port is formed inside the second small-diameter groove-ridge line. A fourth flow path port which matches the second flow path port is formed between the second small-diameter groove-ridge line and the second large-diameter groove-ridge line. The first small-diameter groove-ridge line and second small-diameter groove-ridge line engage with each other in a groove-ridge relationship and at least one of the small-diameter groove-ridge lines has a press-fit allowance in its wall-thickness direction. Also, the first large-diameter groove-ridge line and second large-diameter groove-ridge line engage with each other in a groove-ridge relationship and at least one of the large-diameter groove-ridge lines has a press-fit allowance in its wall-thickness direction. These small-diameter groove-ridge lines and large-diameter groove-ridge lines are, for example, similar in shape to the groove-ridge lines 77 and 78 shown in FIGS. 12 and 13. In this case, when the connecting portion of the manifold base and the connecting portion of the body are connected with each other, the first small-diameter groove-ridge line of the manifold base and the second small-diameter groove-ridge line of the body engage with each other so that both the small-diameter groove-ridge lines are tightly fitted due to the press-fit allowances. Consequently the first flow path port and third flow path port are sealed and connected. Also, the first large-diameter groove-ridge line of the manifold base and the second large-diameter groove-ridge line of the body engage with each other so that both the large-diameter groove-ridge lines are tightly fitted due to the press-fit allowances. Consequently the second flow path port and fourth flow path port are sealed and connected in the space between both the small-diameter groove-ridge lines and both the large-diameter groove-ridge lines. Here, the first small-diameter groove-ridge line and first large-diameter groove-ridge line in the connecting portion of the manifold base are concentrically formed, and the second small-diameter groove-ridge line and second large-diameter groove-ridge line in the connecting portion of the body are concentrically formed. Therefore, fewer alignment errors and high matching accuracy are ensured between the matching small-diameter groove-ridge lines and between the matching large-diameter groove-ridge lines. As a result, the area between the first and second small-diameter groove-ridge lines is securely sealed and the area between the first and second large-diameter groove-ridge lines is securely sealed.

In addition, the technical idea underlying the second embodiment will be explained below.

A connection seal structure for a fluidic device which is constituted by connecting a first component made of resin and a second component made of resin comprises:

a first small-diameter groove-ridge line and a first large-diameter groove-ridge line which are concentrically formed in a connecting portion of the first component;

first flow path port formed inside the first small-diameter groove-ridge line;

a second flow path port formed between the first small-diameter groove-ridge line and the first large-diameter groove-ridge line;

a second small-diameter groove-ridge line and a second large-diameter groove-ridge line which are concentrically formed in a connecting portion of the second component;

a third flow path port formed inside the second small-diameter groove-ridge line to correspond to the first flow path port;

a fourth flow path port formed between the second small-diameter groove-ridge line and the second large-diameter groove-ridge line to correspond to the second flow path port;

a small-diameter seal component made of resin interposed between the first and second small-diameter groove-ridge lines;

a first small-diameter seal groove-ridge line which is formed in the small-diameter seal component and engages with the first small-diameter groove-ridge line in a groove-ridge relationship;

a second small-diameter seal groove-ridge line which is formed in the small-diameter seal component and engages with the second small-diameter groove-ridge line in a groove-ridge relationship;

a press-fit allowance provided in at least one of the first small-diameter groove-ridge line and the first small-diameter seal groove-ridge line in the wall-thickness direction of the first small-diameter groove-ridge line or the first small-diameter seal groove-ridge line;

a press-fit allowance provided in at least one of the second small-diameter groove-ridge line and the second small-diameter seal groove-ridge line in the wall-thickness direction of the second small-diameter groove-ridge line or the second small-diameter seal groove-ridge line;

a large-diameter seal component made of resin interposed between the first and second large-diameter groove-ridge lines;

a first large-diameter seal groove-ridge line which is formed in the large-diameter seal component and engages with the first large-diameter groove-ridge line in a groove-ridge relationship;

a second large-diameter seal groove-ridge line which is formed in the large-diameter seal component and engages with the second large-diameter groove-ridge line in a groove-ridge relationship;

a press-fit allowance provided in at least one of the first large-diameter groove-ridge line and the first large-diameter seal groove-ridge line in the wall-thickness direction of the first large-diameter groove-ridge line or the first large-diameter seal groove-ridge line; and a press-fit allowance provided in at least one of the second large-diameter groove-ridge line and the second large-diameter seal groove-ridge line in the wall-thickness direction of the second large-diameter groove-ridge line or the second large-diameter seal groove-ridge line.

The invention claimed is:

1. A connection seal structure for a fluidic device to be used for handling a chemical liquid, the seal structure including a first component made of resin and a second component made of resin, which are connected with each other, the connection seal structure comprising:

an annular seal component made of resin interposed between a connecting portion of the first component and a connecting portion of the second component, the seal component having end faces formed with a first circumferential groove and a second circumferential groove, each of the first and second circumferential grooves having an upper portion and a lower portion that has opposing sides parallel to each other, a width of each upper portion being wider than a width of each lower portion, each groove including a press-fit allowance in a wall-thickness direction; and a first circumferential protrusion formed in the connecting portion of the first component and a second circumferential protrusion formed in the connecting portion of the second component;

wherein when the connecting portion of the first component and the connecting portion of the second component are moved relatively in only an axial direction, the first circumferential protrusion is engaged in the press-fit allowance of the first circumferential groove and the second circumferential protrusion is engaged in the press-fit allowance of the second circumferential groove, such that the first component and the second component are press-fit with the seal component.

2. The connection seal structure according to claim 1, wherein each of the first and second circumferential grooves has a tapered opening.

3. The connection seal structure according to claim 2, wherein each of the lower portions of the first and second circumferential grooves has a tapered surface portion.

4. The connection seal structure according to claim 1, wherein the opposing sides of each lower portion includes the press fit allowance.

5. A connection seal structure for a fluidic device to be used for handling a chemical liquid, the seal structure including a first component made of resin and a second component made of resin, which are connected with each other, the connection seal structure comprising:

an annular seal component made of resin interposed between a connecting portion of the first component and a connecting portion of the second component, the seal component having end faces formed with a first circumferential protrusion and a second circumferential protrusion;

a first circumferential groove formed in the connection portion of the first component and a second circumferential groove formed in the connecting portion of the second component;

the first and second circumferential protrusions each having a base portion that has opposing sides parallel to each other, a width of the base portion being wider than a width of the first and second circumferential grooves, each protrusion including a press-fit allowance in a wall-thickness direction;

wherein when the connection portion of the first component and the connecting portion of the second component are moved relatively in only an axial direction, the press-fit allowance of the first circumferential protrusion is engaged in the first circumferential groove and the press-fit allowance of the second circumferential protrusion is engaged in the second circumferential groove, such that the first component and the second component are press-fit with the seal component.

6. The connection seal structure according to claim 5, wherein each of the first and second circumferential protrusions has a tapered surface.

7. The connection seal structure according to claim 6, wherein each of the lower portions of the first and second circumferential protrusions have a tapered surface portion.

8. A connection seal structure for a fluidic device to be used for handling a chemical liquid, the seal structure including a first component made of resin and a second component made of resin, which are connected with each other, the connection seal structure comprising:

an annular seal component made of resin interposed between a connecting portion of the first component and a connecting portion of the second component, the seal component having end faces formed with a first circumferential groove and a second circumferential groove, each of the first and second circumferential grooves having an upper portion and a lower portion that has opposing sides parallel to each other, a width of each upper portion being wider than a width of each lower portion;

a first ridge line formed in the connecting portion of the first component and engaged with a first groove line;

a second ridge line formed in the connecting portion of the second component and engaged with a second groove line; and a tapered surface is formed in the first and second ridge lines at a position facing the tapered surfaces of the first and second groove lines, respectively, wherein the tapered surface of the first and second ridge lines presses the tapered surfaces of the first and second groove lines in a direction for engagement of the annular wall when the first component and the second component are each connected to the seal component.

9. The connection seal structure according to claim 8, wherein each of the first and second circumferential grooves has a tapered opening.

10. The connection seal structure according to claim 9, wherein each of the lower portions of the first and second circumferential grooves has a tapered surface portion.

11. The connection seal structure according to claim 8, wherein the opposing sides of each lower portion includes the press fit allowance.

* * * * *